US007039943B1

(12) United States Patent
Hasha

(10) Patent No.: US 7,039,943 B1
(45) Date of Patent: May 2, 2006

(54) AUDIO VISUAL ARCHITECTURE

(75) Inventor: Richard Hasha, Seattle, WA (US)

(73) Assignee: William H. Gates, III, Medina, WA (US)

( * ) Notice: Subject to any disclaimer, the term of this patent is extended or adjusted under 35 U.S.C. 154(b) by 0 days.

(21) Appl. No.: 09/322,643

(22) Filed: May 28, 1999

Related U.S. Application Data

(60) Provisional application No. 60/118,668, filed on Feb. 3, 1999.

(51) Int. Cl.
*H04N 7/173* (2006.01)

(52) U.S. Cl. .......................... 725/131; 725/82; 348/705

(58) Field of Classification Search .................. 725/74, 725/78, 82; 348/705, 706; 370/357, 359, 370/360, 386, 388, 419, 422
See application file for complete search history.

(56) References Cited

U.S. PATENT DOCUMENTS

| 5,621,662 | A | | 4/1997 | Humphries et al. ......... 364/550 |
| 5,675,390 | A | * | 10/1997 | Schindler et al. ............ 715/717 |
| 5,799,041 | A | * | 8/1998 | Szkopek et al. ............. 375/259 |

FOREIGN PATENT DOCUMENTS

| EP | 0854607 A1 | 7/1998 |
| WO | WO 97/31451 | 8/1997 |

OTHER PUBLICATIONS

Friesen et al., "Dave: A Plug-and-Play Model for Distributed Multimedia Application Development" IEEE Parallel & Distributed Technology 1995, XP-002125719.

Ansell, et al., "An Architecture for the Design of TMN Applications", Proceedings of the International Conference on Communications, 1993, pp. 1635-1639, XP000448407.
Sony et al., "The HAVI Specification: Specification of the Home Audio/Video Interoerability (HAVI) Architecture: Version 1.0 Beta." HAVI Organization, San Ramon, CA, US, XP002116332.
Auer et al., "Das Informationsmodell: Ein Konzept für das Management offener Kommunikationssysteme", *Frequenz* 47(1/2), 1993, XP000349214.
Schapeler et al., "Model Based Maintenance for MANs", 1225 Electrical Communication, 1993, pp. 268-277, XP000394420.

* cited by examiner

*Primary Examiner*—Vivek Srivastava
(74) *Attorney, Agent, or Firm*—Woodcock Washburn LLP

(57) ABSTRACT

Each output component (e.g., laserdisc player or output software component) has a source port associated with each type of the output signal that it can output. For example, an output component may output a video signal in RGB format through one source port and may output audio signal in AES formal through another source port. Each input component (e.g., speaker system or input software component) has a sink port associated with each type of input signal that it can input. For example, an input component may input a signal in RGB format through one sink port. The AV system models each port with a corresponding port object. The AV system has a corresponding primitive source port object for each source port and a corresponding primitive sink port object for each sink port.

133 Claims, 14 Drawing Sheets

AUDIO VISUAL ARCHITECTURE

CROSS-REFERENCE TO RELATED APPLICATIONS

This application is related to U.S. patent application No. 60/118,668, entitled "COMMON DISTRIBUTED OBJECT PLATFORM," filed on Feb. 3, 1999; U.S. patent application No. 09/322,455, entitled "METHOD AND SYSTEM FOR TRACKING SOFTWARE COMPONENTS," filed on May 28, 1999; U.S. patent application No. 09/322,962, entitled "METHOD AND SYSTEM FOR TRACKING CLIENTS," filed on May 28, 1999; U.S. patent application No. 09/322,459, entitled "METHOD AND SYSTEM FOR CONTROLLING ENVIRONMENTAL CONDITIONS," filed on May 28, 1999; U.S. patent application No. 09/322,207, entitled "METHOD AND SYSTEM FOR DISTRIBUTING ART," filed on May 28, 1999; U.S. patent application No. 09/322,964, entitled "METHOD AND SYSTEM FOR GENERATING A USER INTERFACE FOR DISTRIBUTED DEVICES," filed on May 28, 1999; U.S. patent application No. 09/322,852, entitled "METHOD AND SYSTEM FOR MANAGING SOFTWARE COMPONENTS," filed on May 28, 1999; U.S. patent application No. 09/322,965, entitled "METHOD AND SYSTEM FOR IMPLEMENTING VIRTUAL FUNCTIONS OF AN INTERFACE," filed on May 28, 1999; and U. S. patent application No. 09/322,457, entitled "METHOD AND SYSTEM FOR PROPERTY NOTIFICATION," filed on May 28, 1999, the disclosures of which are incorporated herein by reference.

TECHNICAL FIELD

The described technology is related to audio/visual systems.

BACKGROUND

A large environment, such as a large building or a large house, may have many audio/video devices located throughout the environment. These AV devices may include CD players, speaker systems, computer systems, television receivers, satellite receivers, displays, and so on. In addition, many sources of media may be available. One such media is a jukebox containing a variety of compact discs. The AV devices typically provide a control panel through which the device can be controlled. For example, a CD player provides a control panel that allows a CD to be started, paused, or stopped. Typically, the interconnections between the AV devices are static. That is, when the AV devices are installed, cabling is routed between devices. For example, speaker wire may be routed between an amplifier and speakers.

A problem with such static interconnections it is very expensive and difficult to provide all the desired interconnections and to change connections. Another problem is that it is cumbersome to use only the control panels to control the devices. It would be desirable to have an architecture that would support the dynamic interconnection between devices.

DETAILED DESCRIPTION

Each output component (e.g., laserdisc player or output software component) has a source port associated with each type of the output signal that it can output. For example, an output component may output a video signal in RGB format through one source port and may output audio signal in AES format through another source port. Each input component (e.g., speaker system or input software component) has a sink port associated with each type of input signal that it can input. For example, an input component may input a signal in RGB format through one sink port. The AV system models each port with a corresponding port object. The AV system has a corresponding primitive source port object for each source port and a corresponding primitive sink port object for each sink port.

Each source port can be connected to one or more input ports. For example, a source port that outputs a video signal can be connected to the input ports of several monitor devices. The path between a source port and a sink port can be static or dynamic. A static path may correspond to a direct connection between a source port and a sink port of the output component. A dynamic path can be established through a switching mechanism. A switching mechanism allows for its sink ports to be connected to its source ports so that a path can be established. The connection can be a virtual circuit or a transport medium. For example, a certain bandwidth of the transport medium may be allocated for the connection. The path between a source port and a sink port is referred to as a primitive circuit. A primitive circuit may be a direct path between a source port of an output component and a sink port of an input component. A primitive circuit may also be a path between a source port of an output component with an input switching port (a type of sink port) of a switching mechanism. Similarly, a primitive circuit may be a path between an output switching port (a type of source port) of a switching mechanism to a sink port of an input component. The AV system has a corresponding primitive circuit object for each path with a signal origination from a source port and/or terminating at a sink port, corresponding input switching port object for each input switching port, and an output switching port object for each output port.

Figure 1:
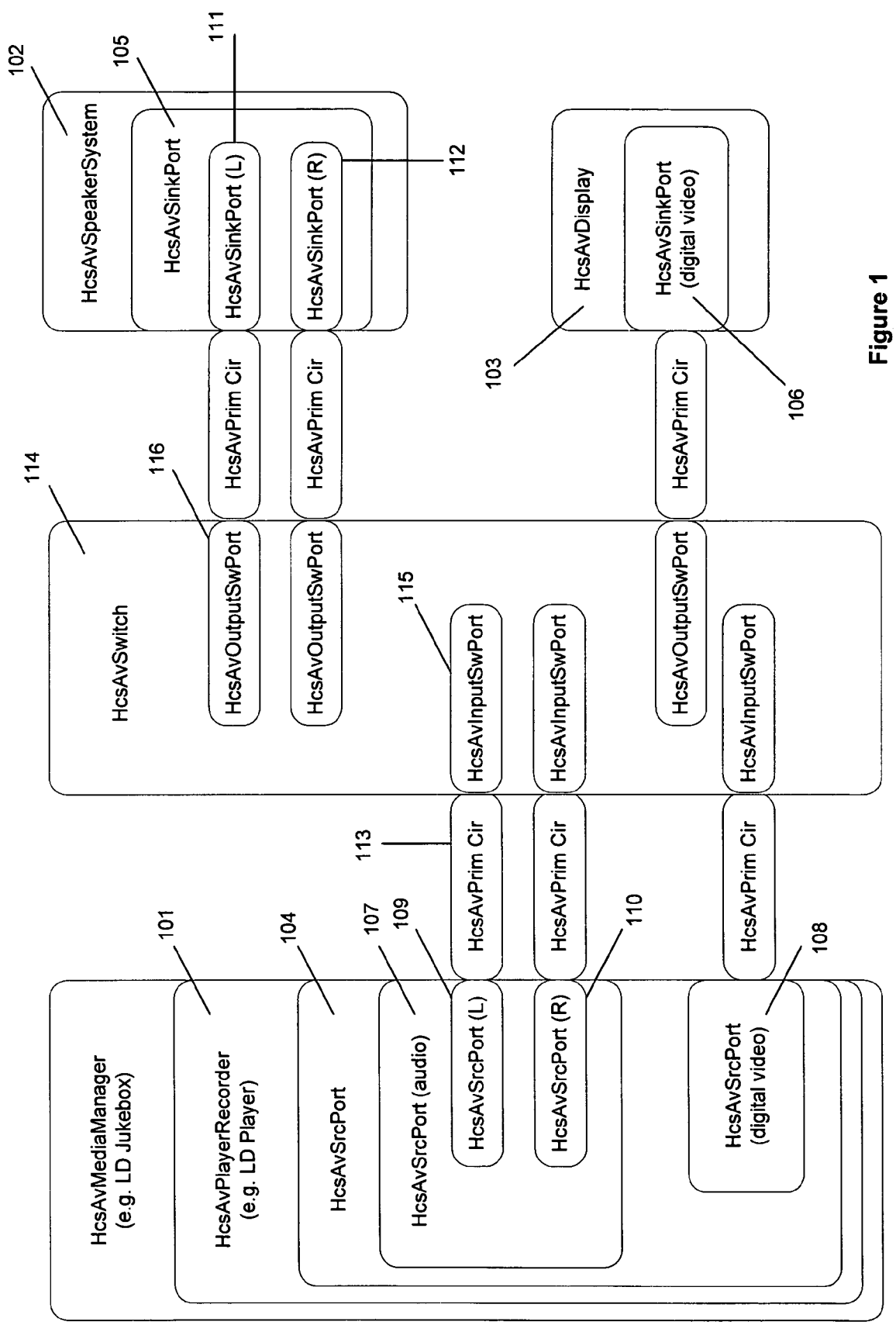
FIG. 1 is a block diagram illustrating network layer objects that model the path between output components, switching mechanisms, and input components.

FIG. 1 is a block diagram illustrating network layer objects that model the path between output components, switching mechanisms, and input components. In this example, a laserdisc player is connected to a speaker system and a display. The laserdisc player includes three physical source ports: one for digital video, one for left audio, and one for right audio. The source ports have a direct path to input switching ports of the switching mechanism. The speaker system has two sink ports: one for left audio and one right audio. The display has a sink port for digital video. The sink ports of the output devices have direct paths to the output switching ports of the switching mechanism. The AV system represents each of these components with a corresponding object in memory. The player recorder object 101 corresponds to the laserdisc player. The speaker system object 102 corresponds to the speaker system, and the display object 103 corresponds to the display. The AV system represents multiple ports of a component by a single aggregating port object. The source port object 104 corresponds to the source ports of the laserdisc player, the sink port object 105 corresponds to the sink ports of the speaker system, and the sink port object 106 corresponds to the sink port of the display. Each port object may contain nested port objects to organize the ports of a component in a hierarchy. In this example, the source ports of the laserdisc player are represented by an aggregate source port object 104 that contains two child source port objects. A one child source port object 107 represents the audio source ports, and the other child source port object 108 represents the video source port. The source port object representing the audio source port contains two source port objects. One source object 109 represents the left audio source port, and the other source port object 110 represents at the right audio source port. Similarly, the sink port object 105 represents the sink ports of the speaker system and contains two child sink ports. One sink port object 111 represents the left audio sink port, and the other child sink port object 112 represents the right audio sink port. Since the display has only one sink port, its corresponding sink port object 106 has no child sink ports. A source port object or a sink port object that has no child port is referred to as a primitive port object. For example, source port objects 109 and 110 are primitive source ports. A port object that is not a child of any other port object is referred to as a complete port object. For example, source port object 104 is a complete source port object. Sink port object 106 is both a primitive sink port object and a complete sink port object.

The AV system may represent each path by a primitive circuit object. In this example, primitive circuit object 113 corresponds to a direct path between the left audio source port of the laserdisc player and an input switch port of the switching mechanism. The AV system represents the switching mechanism by a switch object 114. A switch object contains an input source port object 115 for each of its input switch ports and an output switch port object 116 for each of its output switch ports.

Figure 2:
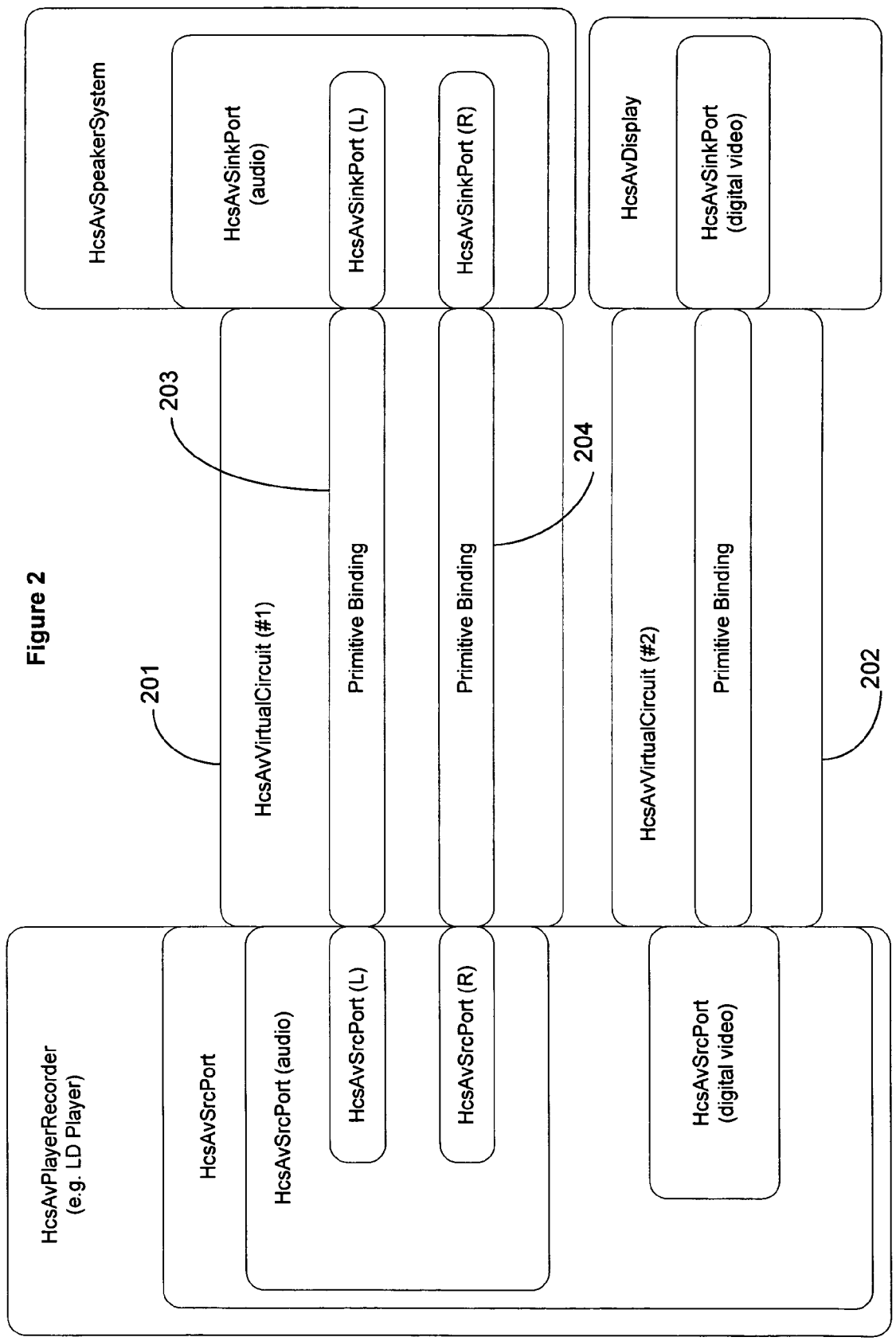
FIG. 2 is a block diagram illustrating the session layer objects that represent virtual circuits.

The AV system represents a path for a signal between a complete source port and a complete sink port by a virtual circuit. A signal models actual informational context that is on a path. A virtual circuit may represent static and dynamic connections. FIG. 2 is a block diagram illustrating the session layer objects that represent virtual circuits. The AV system represents a virtual circuit by a virtual circuit object. The virtual circuit object 201 corresponds to the path between the complete source port of the laserdisc player and the complete sink port of the speaker system. The virtual circuit object 202 corresponds to the path between the source port of the laserdisc player and the complete sink port of the display. The virtual circuit object 201 corresponds only to the audio source ports of the laserdisc player, and the virtual circuit object 202 corresponds only to the video source ports of the laserdisc player. Each virtual circuit object contains a primitive binding information corresponding to each of the paths within that virtual circuit. For example, the virtual circuit object 201 contains a primitive binding information 203 and 204. The AV system allows each source port to be connected to multiple sink ports.

Figure 3:
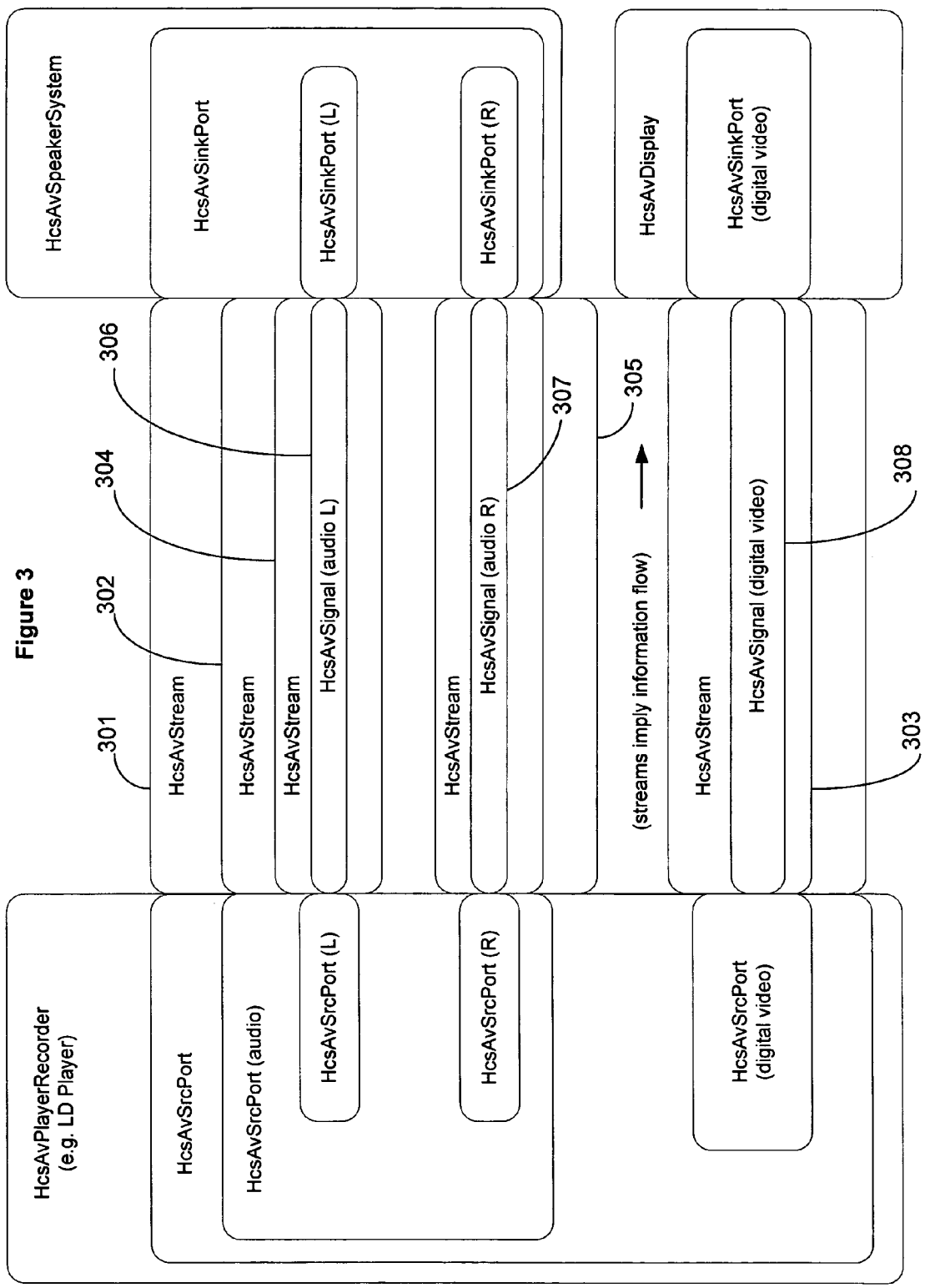
FIG. 3 is a block diagram illustrating management laser objects.

FIG. 3 is a block diagram illustrating management layer objects. The AV system represents the signals that are output by the source ports of an output component as a stream. That is, each output outputs a stream of signals. The signals within the stream are hierarchically organized in a manner that is similar to how source ports are organized within a complete source port. The AV system represents the stream of an output component by a stream object that may contain other stream objects. In this example, the output signals of the laserdisc player are represented by stream object 301. The audio signals of the laserdisc player are represented by child stream object 302, and the video signal of the laserdisc player is represented by child stream object 303. The audio stream object contains a child stream object 304 representing the left audio signal and a child stream object 305 representing the right audio signal. A stream object that does not contain other stream objects is referred to as a primitive stream object. A stream object that is not contained within other stream objects is referred to as a complete stream object. For example, stream object 301 is a complete stream object, and stream object 304 is a primitive stream object. Each primitive stream object contains a signal object that corresponds to the signal that is output by the corresponding source port. Signal object 306 corresponds to the signal that is transmitted between the left audio source port of the laserdisc player and the left sink port of the speaker system. Signal object 307 corresponds to the signal that is transmitted between the right audio source of the laserdisc player and the right sink port of the speaker system. Signal object 308 corresponds to the signal that is transmitted from the video source port of the laserdisc player to the sink port of the display.

Figure 4:
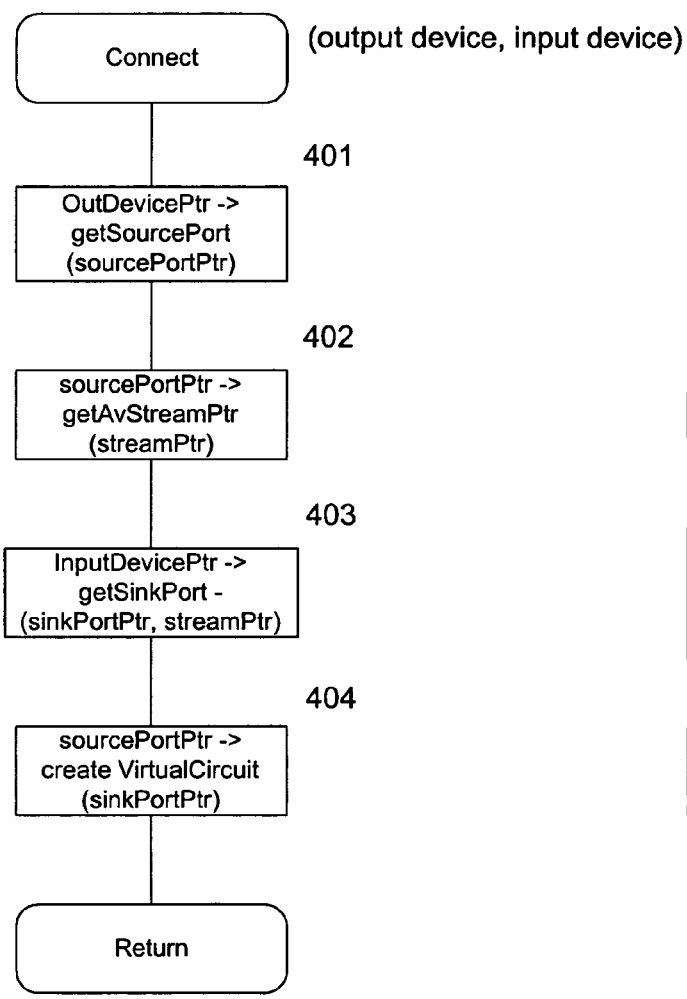
FIG. 4 is a diagram illustrating the establishment of a path between an output component and an input component.

FIG. 4 is a diagram illustrating the establishment of a path between an output component and an input component. A path is established using an object that represents the output component and an object that represents the input component. In step 401, the process requests the output object to provide a pointer to a complete source port object. In step 402, the process requests the source port object for a pointer to its complete stream object. In step 403, the process requests the input object to provide a pointer to its complete sink port object. In step 404, the process asks the source port object to create a virtual circuit object that establishes a path between the source port to the sink port. The process is then complete.

Figure 5:
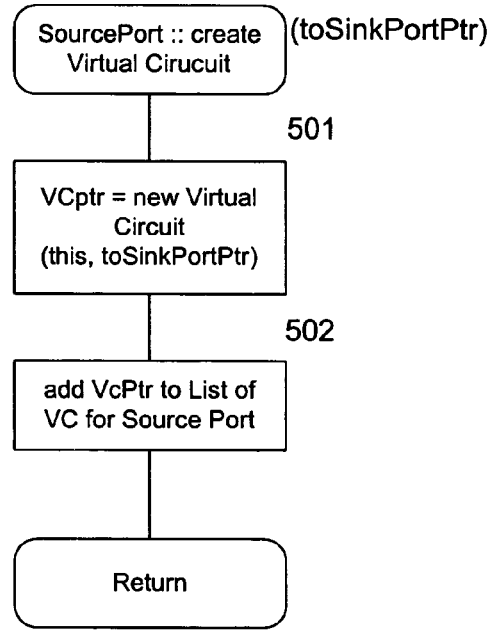
FIG. 5 is a flow diagram representing a function of a complete source port object for creating a virtual circuit object.

FIG. 5 is a flow diagram representing a function of a complete source port object for creating a virtual circuit object. This function performs the processing necessary to establish a path for a signal between a primitive source port and a primitive sink port. The create virtual circuit function is passed a pointer to the sink port object. In step 501, the function creates a new virtual circuit object passing a pointer to the source port object and a pointer to the sink port object. In step 502, the function adds the virtual circuit object to a list of virtual circuits for the source port object. The function then returns.

Figure 6:
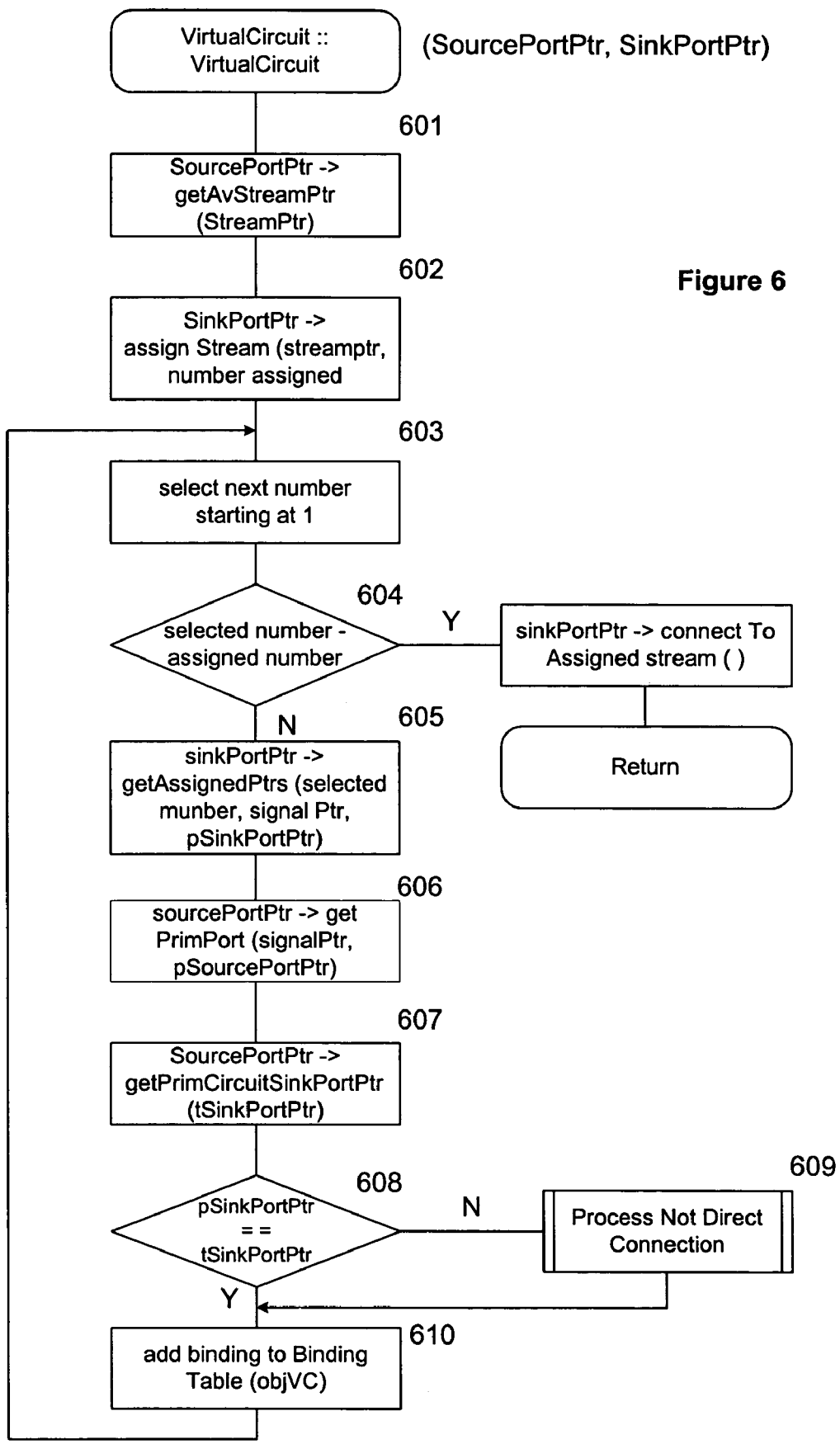
FIG. 6 is a flow diagram of example implementation of the constructor for a virtual circuit object.

FIG. 6 is a flow diagram of example implementation of the constructor for a virtual circuit object. The constructor is passed a pointer to a source port object and a pointer to a sink port object. In the step 601, the constructor retrieves a pointer to the stream associated with the source port object. In step 602, the constructor assigns the stream to the sink port object by invoking the assign stream function of the sink port object passing a pointer to the stream object. The assign stream function returns the number of signal objects within the stream object that are assigned to the complete sink port object. In steps 603–610, the constructor loops creating a primitive binding object for each signal object that is assigned to the sink port object. In step 603, the constructor selects the next signal number starting with 1. In step 604, if the selected number is greater than the number of assigned signals, then the constructor returns, else the constructor continues at step 605. In step 605, the constructor retrieves a pointer to the primitive sink port object corresponding to the numbered signal object and retrieves a pointer to the signal object itself. The constructor retrieves these pointers by invoking the get assignment pointer function of the sink port object. In step 606, the constructor retrieves a pointer to the primitive source port object for the corresponding signal port object. In step 607, the constructor retrieves a pointer to the sink port object of the primitive source port object. In step 608, if the primitive sink port object of the primitive circuit of the primitive sink port object is the same as the primitive sink port object of the primitive circuit of the primitive source port object, then a direct connection exists between the source port and the sink port. Otherwise, the connection is through a switching mechanism. If the connection is through a switching mechanism, then the constructor continues at step 609, else the constructor continues at step 610. In step 609, the constructor invokes a process-not-direct-connection function. In step 610, the constructor adds an identification of the binding from the primitive source port to the primitive sink port to the binding table of the virtual circuit object. A binding represents the identity of the primitive source port object and the primitive sink port object. If the connection is not direct, the binding also includes the identity of the input switch port object and the output switch port object of the switching mechanism. The function then loops to step 603 to process the next signal object.

Figure 7:
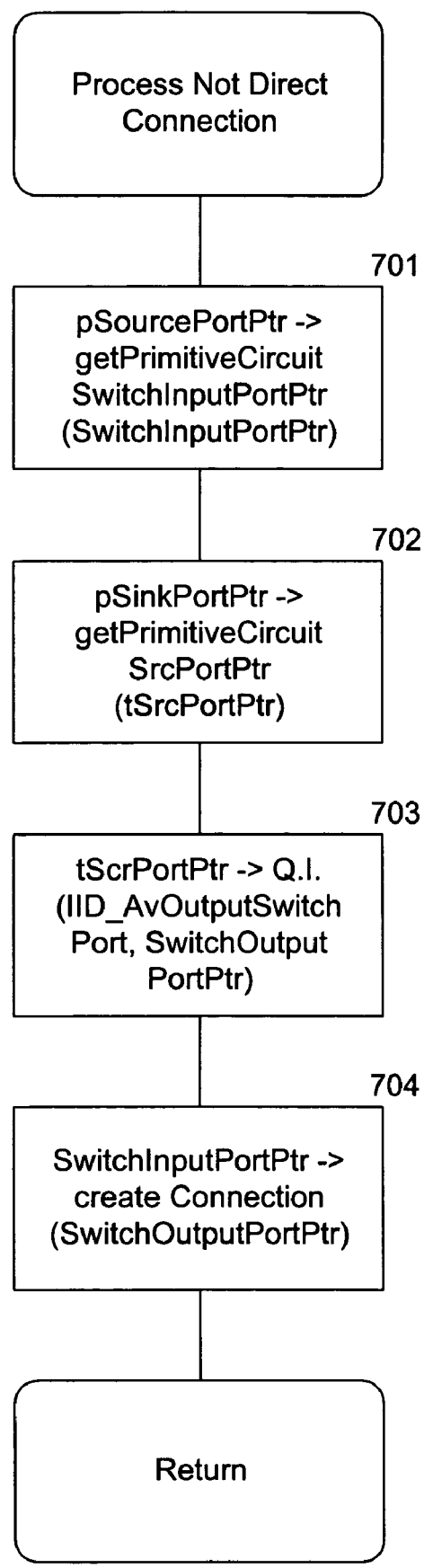
FIG. 7 is a flow diagram illustrating an example implementation of process-not-direct-connection function.
Figure 9:
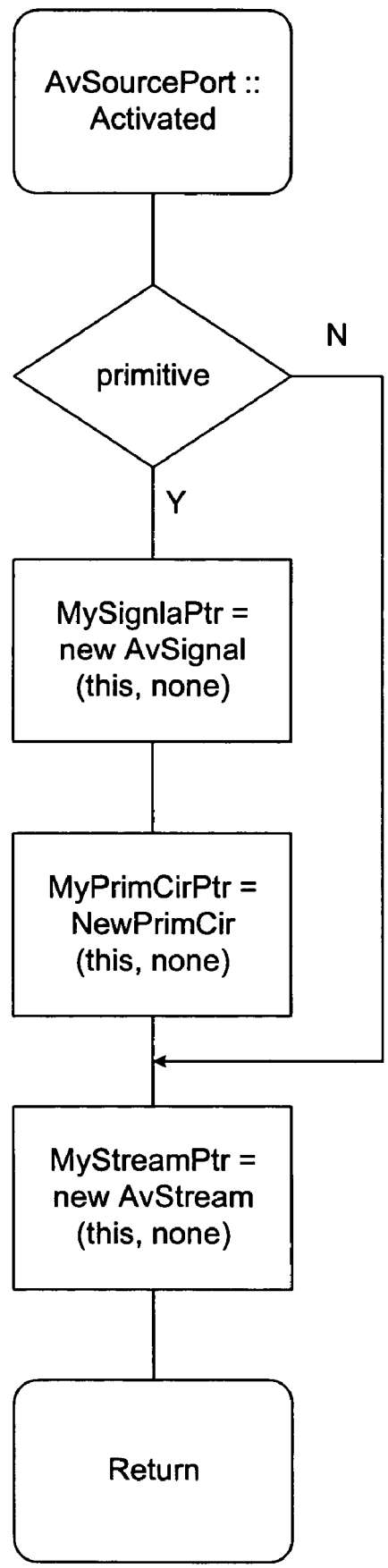
FIG. 9 is a flow diagram illustrating an example implementation of an activation of an AV source port function.

FIG. 7 is a flow diagram illustrating an example implementation of process-not-direct-connection function. In step 701, the function retrieves a pointer to switch input port object for the primitive circuit of the primitive source port object. In step 702, the function retrieves a pointer to the primitive source port object. In step 703, the function retrieves a pointer to the output switch port object of the retrieved primitive circuit. In step 704, the function creates a connection between the input switch port object and the output switch port object. The function then returns.

```
class AvPort
{
    getOwnerObjectPtr (resultPtr);
    isCompletePort( );
    isPrimitivePort( );
    getParentPortPtr(portPtr);
    getNumberOfChildPorts(number);
    getChildPortPtr(number, portPtr);
    setProperty(resetIn);
    setProperty(resetOut);
}
getOwnerObjectPtr (resultPtr);
```

This function returns a pointer to the owner object of the port. The owner of the port is the object that directly contains a complete port. Each port within the port hierarchy as the same owner object.

isCompletePort( );

This function returns an indication as to whether this port is a complete port.

isPrimitivePort( );

This function returns an indication as to whether this port is a primitive port.

getParentPortPtr(portPtr);

This function returns a pointer to the parent port of this port. The parent port is that port which is the next higher port in the port hierarchy.

getNumberOfChildPorts(number);

This function returns the number of child ports of this port.

getChildPortPtr(number, portPtr);

This function returns a pointer to the child port designated by the passed port.

```
class AvSinkPort : AvPort
{
isConnectedToStream( );
getAvStreamPtr(streamPtr);
assignStream(streamPtr, number);
unassignStream( );
getNumberOfAssignments(number);
getAssignmentsPtrs(number, assignedSignalPtr, toPrimitivePortPtr)
connectToAssignedStream( );
}
``` isConnectedToStream( );

This function returns an indication whether this sink port is connected to a stream.

getAvStreamPtr(streamPtr);

This function returns a pointer to the stream to which this sink port is connected.

assignStream(streamPtr);

This function informs a sink port that it is to consider the signals within a stream for the purpose of assigning them to a primitive sink port.

unassignStream( );

This function undoes the assigning.

getNumberOfAssignments(number);

This function returns the number of assignments between a signal and a primitive sink port that was made during the assignment.

getAssignmentsPtrs(number, assignedSignalPtr, toPrimitivePortPtr);

This function is passed an assignment number and returns an indication of the signal that is assigned to the primitive port.

connectToAssignedStream( );
This function is used to inform a complete sink port and its container of the assigned stream so that any action appropriate to the connection can be taken, such as powering on the output component.

```
class AvSignal
{
getSignalUsage(usage);
getSignalFormat(format);
getParentStreamPtr(streamPtr);
getSourcePortPtr(sourcePortPtr);
}
``` getSignalUsage(usage);
This function returns the usage of the signal. The usage may be, for example, left audio or the red of an RGBsignal.

getSignalFormat(format);
This function returns the format of the signal. The format may be, for example, 601 video or AES audio.

getParentStreamPtr(streamPtr);
This function returns a pointer to the stream which is the parent of this signal. That is, the primitive stream that is carrying the signal.

getSourcePortPtr(sourcePortPtr);
This function returns a pointer to the primitive source port that is outputting this signal.

```
class AvStream
{
IsCompleteStream( );
IsPrimitiveStream( );
getParentStreamPtr(streamPtr);
getNumberOfChildStreams(number);
getChildStreamPtr(number, streamPtr);
getSourcePortPtr(sourcePortPtr);
getSourceProgramPtr(sourceProgramPtr);
getSignalPtr(signalPtr);
}
```

IsCompleteStream( );
This function returns an indication as to whether this stream is a complete stream.

IsPrimitiveStream( );
This function returns an indication as to whether this stream is a primitive stream.

getParentStreamPtr(streamPtr);
This function returns a pointer to the stream that is the parent of this stream.

getNumberOfChildStreams(number);
This function returns the number of child streams of this stream.

getChildStreamPtr(number, streamPtr);
This function returns a pointer to the numbered child stream of this stream.

getSourcePortPtr(sourcePortPtr);
This function returns a pointer to the source port that is producing this stream. The source port is at the same level in its hierarchy as this stream is in its hierarchy.

getSourceProgramPtr(sourceProgramPtr);
This function returns a pointer to the source program that is producing this stream.

getSignalPtr(signalPtr);
This function returns a pointer to the signal in this stream as a primitive stream.

```
class AvPrimitiveCircuit
{
getSourcePortPtr(sourcePortPtr);
getSinkPortPtr(sinkPortPtr);
}
``` getSourcePortPtr(sourcePortPtr);
This function returns a pointer to the primitive source port of this primitive circuit.

getSinkPortPtr(sinkPortPtr);
This function returns a pointer to the primitive sink port of this primitive circuit.

```
class AvInputSwitchPort : AvSinkPort
{
getNumberOfConnections(number);
getConnectionPtr(number, outputSwitchPortPtr);
createConnection(outputSwitchPortPtr);
removeConnection(outputSwitchPortPtr);
}
``` getNumberOfConnections(number);
This function returns the number of connections from this input switch port to output switch ports.

getConnectionPtr(number, outputSwitchPortPtr);
This function returns a pointer to the numbered output switch port that is connected to this input switch port.

createConnection(outputSwitchPortPtr);
This function creates a connection from this input switch port to the passed output switch port.

removeConnection(outputSwitchPortPtr);
This function removes a connection from this input switch port to the passed output switch port.

```
class AvOutputSwitchPort : AvSourcePort
{
getInputConnectionPtr(inputSwitchPortPtr);
}
``` getInputConnectionPtr(inputSwitchPortPtr);
This function gets the input switch port to which this output switch port is connected.

```
class AvVirtualCircuit
{
getCompleteSourcePort(sourcePortPtr);
getCompleteSinkPort(sinkPortPtr);
getNumberOfPrimitiveBindings(number);
getPrimitiveBindingPtrs(number, sourcePortPtr, sink-
    PortPtr);
}
``` getCompleteSourcePort(sourcePortPtr);
This function returns a pointer to the complete source port that is producing the signals being routed by this virtual circuit.

getCompleteSinkPort(sinkPortPtr);
This function returns a pointer to the complete source port that is receiving the signals being routed by this virtual circuit.

getNumberOfPrimitiveBindings(number);
This function returns the number of bindings between primitive source ports and primitive sink ports for this virtual connection.

getPrimitiveBindingPtrs(number, sourcePortPtr, sink-PortPtr);
This function returns the numbered binding as a pointer to the primitive source port and a pointer to the primitive sink port.

AvSourcePort
```
class AvSourcePort : AvPort
{
isActiveSourcePort( );
getAvStreamPtr(streamPtr);
getPrimitiveCircuitPtr(primitiveCircuitPtr);
getNumberOfVirtualCircuits(number);
getVirtualCircuitPtr(number, virtualCircuitPtr);
createVirtualCircuit(toSinkPortPtr);
removeVirtualCircuit(toSinkPortPtr);
}
```
isActiveSourcePort( );

This function returns an indication of whether this source is active. A source port is active when it is capable of producing a signal.

getAvStreamPtr(streamPtr);

This function returns a pointer to the stream associated with this source port.

getPrimitiveCircuitPtr(primitiveCircuitPtr);

This function returns a pointer to the primitive circuit associated with this source port.

getNumberOfVirtualCircuits(number);

This function returns the number of virtual circuits that are associated with this source port.

getVirtualCircuitPtr(number, virtualCircuitPtr);

This function returns a pointer to the numbered virtual circuit.

createVirtualCircuit(toSinkPortPtr);

This function creates a virtual circuit that connects this source port to the passed sink port.

removeVirtualCircuit(toSinkPortPtr);

This function removes the virtual circuit that connects the source port to the passed sink port.

Figure 10:
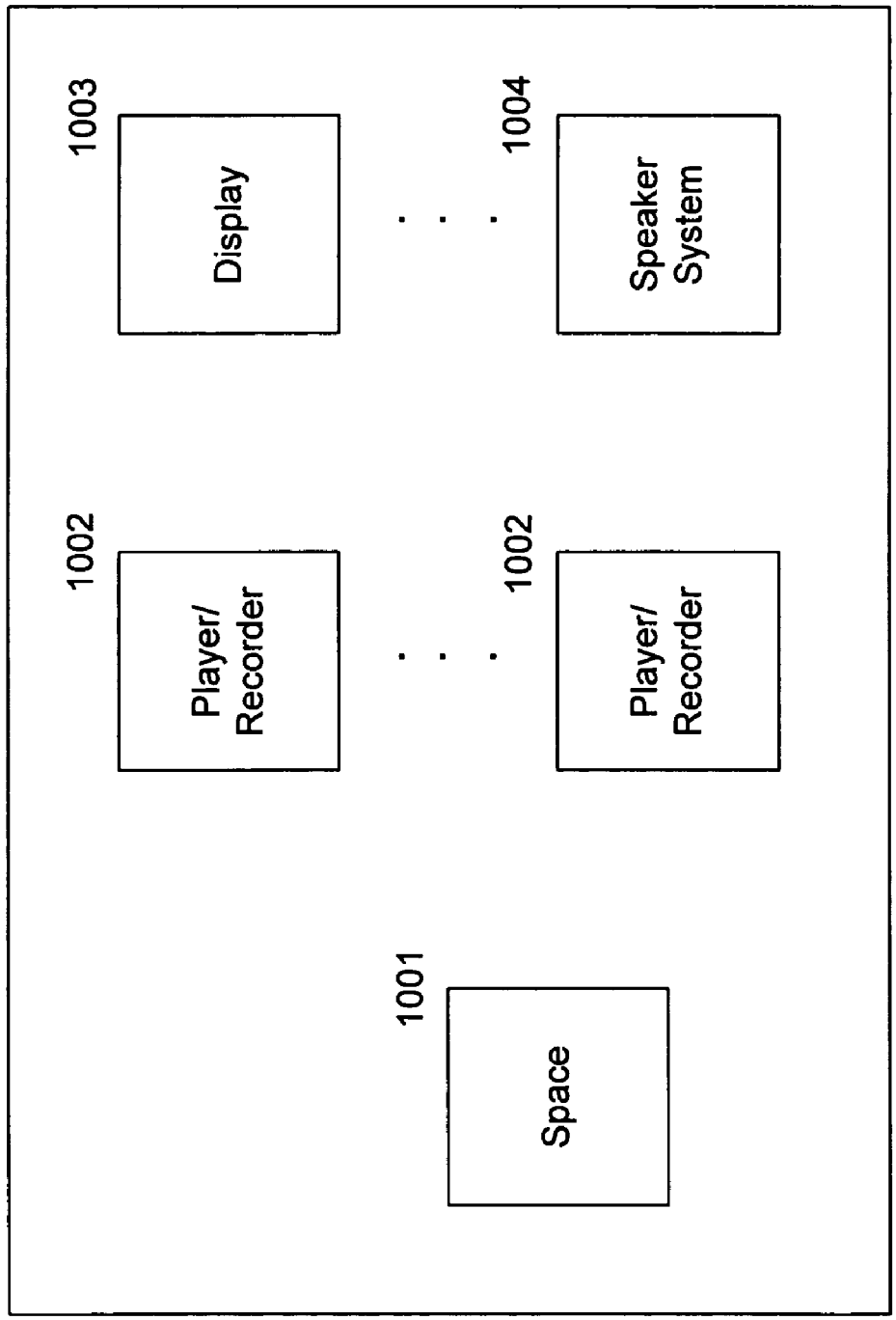
FIG. 10 is a block diagram illustrating the components of an entertainment center.

FIG. 10 is a block diagram illustrating the components of an entertainment center. An entertainment center component provides a behavior that allows an AV program to be assigned to a player/recorder component. When a program is assigned to an entertainment center, the entertainment center performs the processing that is needed to load that program into a player/recorder, cause the program to be played, and route the output signals of the player/recorder component to output components. An entertainment center may be associated with a space (e.g, a room within a house). The entertainment center may also be associated with multiple player/recorders and multiple output components such as a display component and a speaker subsystem component. The AV system represents the associated space by a space object 1001, represents the player/recorder components by player/recorder objects 1002, and represents the output components by a display object 1003 and a speaker subsystem object 1004. An entertainment center may have a default set of the output components. When a program is assigned to the entertainment center, the output signals for the player/recorder component are routed to these default output components. The entertainment center controls the creating of virtual circuits that are needed to effect this routing. The entertainment center may also allow the output signals of a player/recorder component to be dynamically routed to different output components. For example, the entertainment center may allow the output of the player/recorder component to be dynamically routed to a speaker system component associated with another space. To effect this dynamic routing, the AV system creates and destroys virtual circuits dynamically. In one embodiment, the entertainment center may determine for each of its output components whether the routing should be allowed, whether to be notified when an output signal is routed due to an action external to the entertainment center, and whether to provide a user interface for controlling the output component to which the signal is routed. These determinations may be different for each output component associated with the entertainment center. When an entertainment center is notified that one of its output components has been routed due to an external action (e. g. a different entertainment center routing to the output component causing the notification), the entertainment center can become an additional controller of the player/recorder. An entertainment center may also provide property notifications when the properties of its associated player/recorder components or output components change. For example, the entertainment center may notify a corresponding user interface component that the pause button on a player/recorder component has been depressed. An entertainment center object may provide a user interface component that is appropriate for controlling the user interface of the input components and output components associated with the entertainment center.

Figure 11:
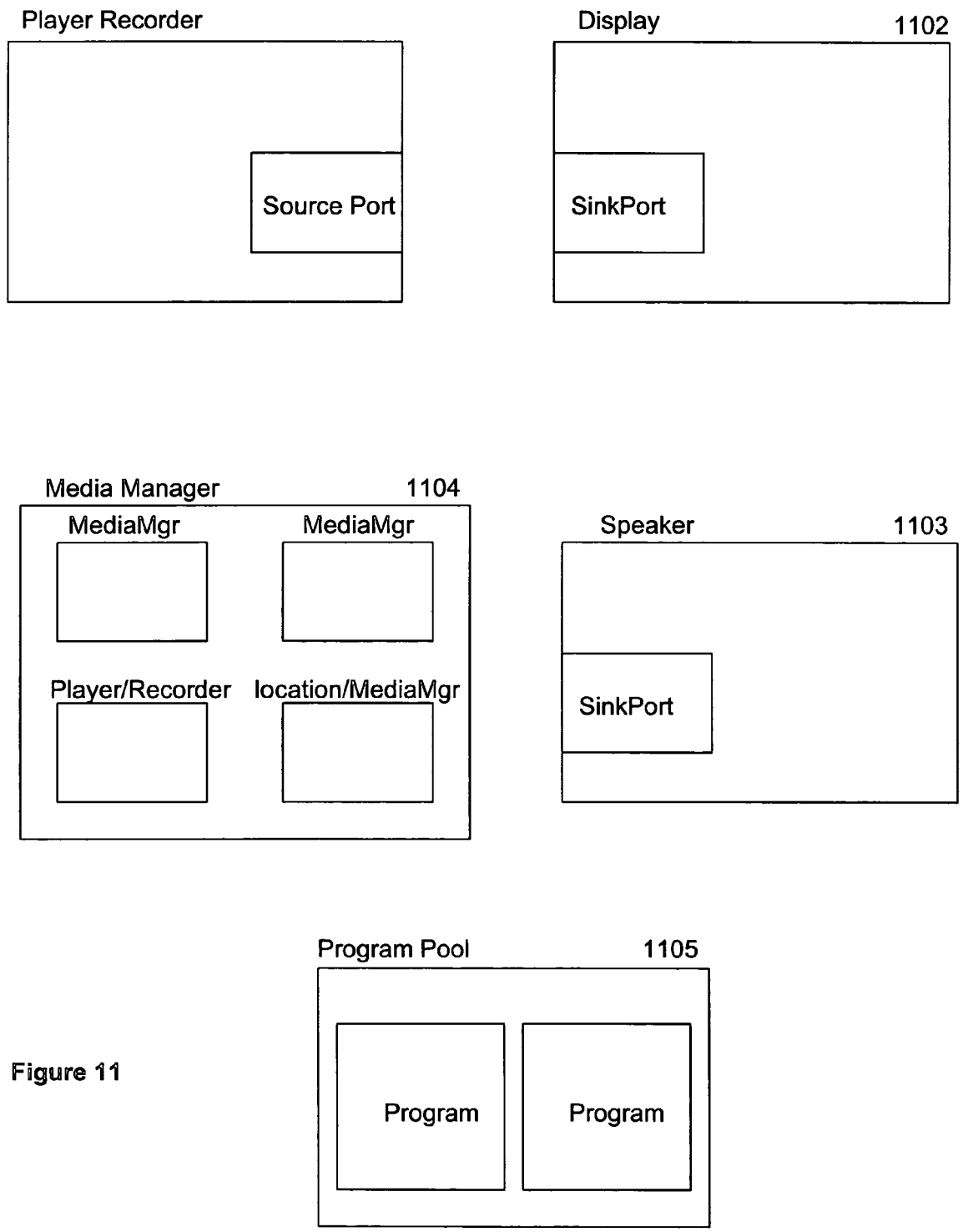
FIG. 11 illustrates a block diagram illustrating various components of the AV system.

FIG. 11 illustrates a block diagram illustrating various components of the AV system. The AV system includes player/recorder objects 1101, display objects 1102, speaker system objects 1103, media manager objects 1104, and program objects 1105. A player/recorder object has one or more complete source port objects associated with it and may have one or more complete sink port objects associated with it. Each output object has one or more complete sink ports associated with it. A player/recorder object typically corresponds to a physical player/recorder component, such as laserdisc player. The player/recorder object provides a behavior to load an AV program into the player/recorder component. A player/recorder object also provides a behavior that allows commands to be sent to the player/recorder component. For example, after a laserdisc has been loaded, a start, pause, or stop command can be sent via the player/recorder object to the player/recorder component. The player/recorder object also provides the behavior to determine whether a particular AV program can be loaded into the player/recorder component. A player/recorder object may also provide additional behavior that is customize to the characteristics of the corresponding player/recorder component.

The output objects that correspond to the output components provide a behavior that returns the identification of a sink port object that is appropriate for assigning the signals associated with a specified stream object. For example, a speaker system object that is passed a stream that includes both video and audio signals would return an indication that only audio sink ports are to be assigned. The output objects may also provide additional behavior that is specific to the type of output component. For example, a display object may provide behavior for turning the display on and off and for controlling the contrast of the display. A speaker system object may provide behavior for controlling the volume, equalizer functions, and surround sound system controls. This additional behavior may be part of the base object class or may be provided through a derivation of that base object class.

A program pool object represents a collection of AV programs. Each AV program has a corresponding program object. An AV program conceptually corresponds to a media that can be played by a player/recorder component. For example, an AV program may represent the feed provided through a certain television channel, a musical score stored on a CD, a movie stored on a laserdisc, and so on. These AV programs can be hierarchically organized to represent more complex AV programs. For example, an AV program may include a sub-AV program corresponding to the feed from a television channel and a sub-AV program corresponding to the output of a computer program. Thus, AV programs can represent arbitrarily complex multimedia programs. The AV system represents an AV program by a program object. A program object provides the behavior to browse through the hierarchy of the AV programs represented by that program object, allows a player/recorder component to be assigned to the AV program, and provides a behavior corresponding to the loading of the AV program into the player/recorder component. A program object also has a program ID, which provides descriptive information about the AV program. For example, descriptive information may include the name of the movie that the AV program represents. A program object stores the location of the media that corresponds to the AV program. For example, if the AV program corresponds to a laserdisc in a certain laserdisc stack, then the location would indicate the stack and slot of the laserdisc within the stack. In one embodiment, the location is represented as a path within a hierarchy of locations. A program object stores the identifier of an owner, which may be the program pool object that the program object is within. A program object allows for the retrieving of its child program objects and may allow for certain criteria to be established so that only children that match the criteria are returned. A program object may also allow for retrieving of its parent program object. In one embodiment, the parent program object may be retrieved through the containing program pool by providing the location of the program object to the program pool. A program object has a program type associated with it. The program type specifies a path through a hierarchy of program types. The hierarchy of program types is described below in detail.

In one embodiment, the AV system provides a capability for resolving a program ID into many different types of references. For example, the AV system may provide a get program object function that inputs a program ID and returns a reference to a corresponding program object. The AV system may also provide a get program genre function that inputs a program ID and returns a set of program objects in the same genre. For example, a program ID for a country music song when provided to the get program genre function would return references to program objects corresponding to other country music songs. To implement such multi-resolution references, the functions may access the program object associated with the program ID to retrieve information on its genre.

A program object may provide alternate interfaces for maintenance of state. For example, a program object may provide an interface for adding and deleting properties of the program object and setting properties of the program object. An alternate interface may also provide for the adding and deleting of child program objects or for the deleting of the program object itself. These interfaces may be specific to the type of AV program represented by the program object.

A program pool has a corresponding program pool object. A program pool object provides an access port for each client that is accessing the program pool. The program pool object provides a function that receives a program ID and returns a reference to a program object corresponding to that program ID. A program pool object also allows for database cursor-like access to the program objects. For example, a query can be submitted which specifies the criteria for program objects. The program objects that match that criteria are provided in a result set. The client can access that result set using techniques such as advance to the next program object, get reference for the current program object, and return a set of references for the program objects in the result set. In one embodiment, the result set of a query may be cached at a client to reduce communications between the clients in the program pool. The program pool may also automatically update the client's cache as the set of programs that match the criteria changes. In one embodiment, the program pool provides an access control mechanism to restrict access by certain clients. The program pool may use the phantom object mechanism as described in commonly assigned copending U.S. patent application No. 09/322,455, entitled "Method and System for Tracking Clients," filed May 28, 1999.

The media manager provides a mechanism for managing media at its location and for providing a player/recorder object for the media itself. For example, a media manager object may correspond to a multi-laserdisc stack. The media manager object provides a load program function that is passed a program object and that returns a player/recorder object with that program loaded. A media manager may be hierarchically organized. That is, a media manager object may have child media manager objects to an arbitrary level of nesting. Each parent media manager object may have an associated location table. The location table maps the location of a program to the media manager object that is responsible for returning the player/recorder object for that program object. A media manager object that has no child object may process the location of the program object to identify which player/recorder to associate with the program object. For example, if a media manager object represents a multi-laserdisc stack, then the media manager object may use the location associated with that program object to determine which slot within the stack contains the media for that program.

Figure 12:
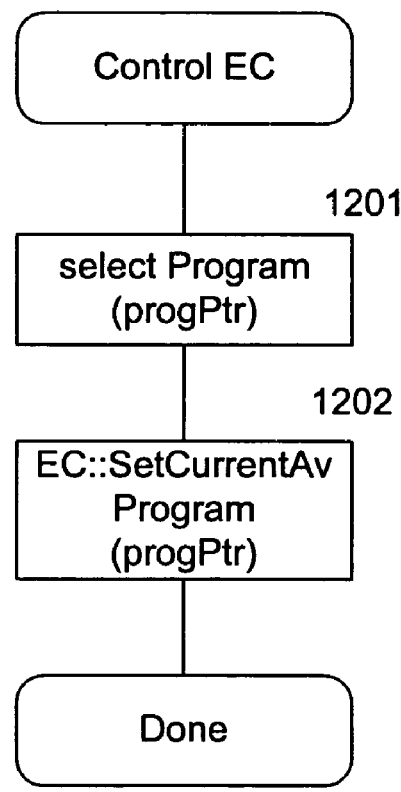
FIG. 12 is a flow diagram illustrating the assigning of a program to an entertainment center.

FIG. 12 is a flow diagram illustrating the assigning of a program to an entertainment center. In step 1201, the function invokes a function to select a certain program object. The invoked function returns a pointer to the program object. In step 1202, the function invokes the set current program function of the entertainment center object passing the pointer to the program object. The processing is then complete.

Figure 13:
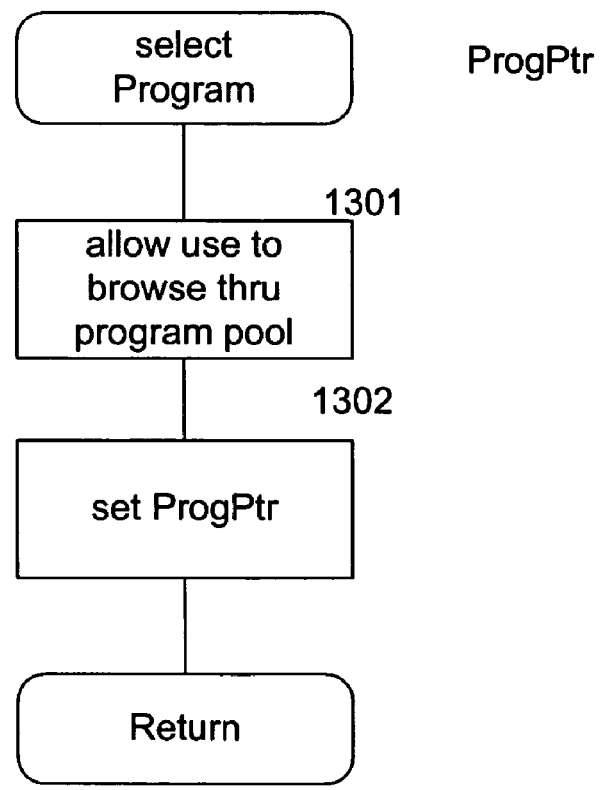
FIG. 13 is a flow diagram of function to select a program.

FIG. 13 is a flow diagram of a function to select a program. This function may display a user interface that allows a user to browse through the programs in a program pool. The user interface may allow the user to specify various search criteria. For example, the user interface may allow the user to specify the type of music that is of interest. In step 1301, the function allows the user to select a program from the program pool. In step 1302, the function sets the return pointer to a pointer to a program object representing the program. The function then returns.

Figure 14:
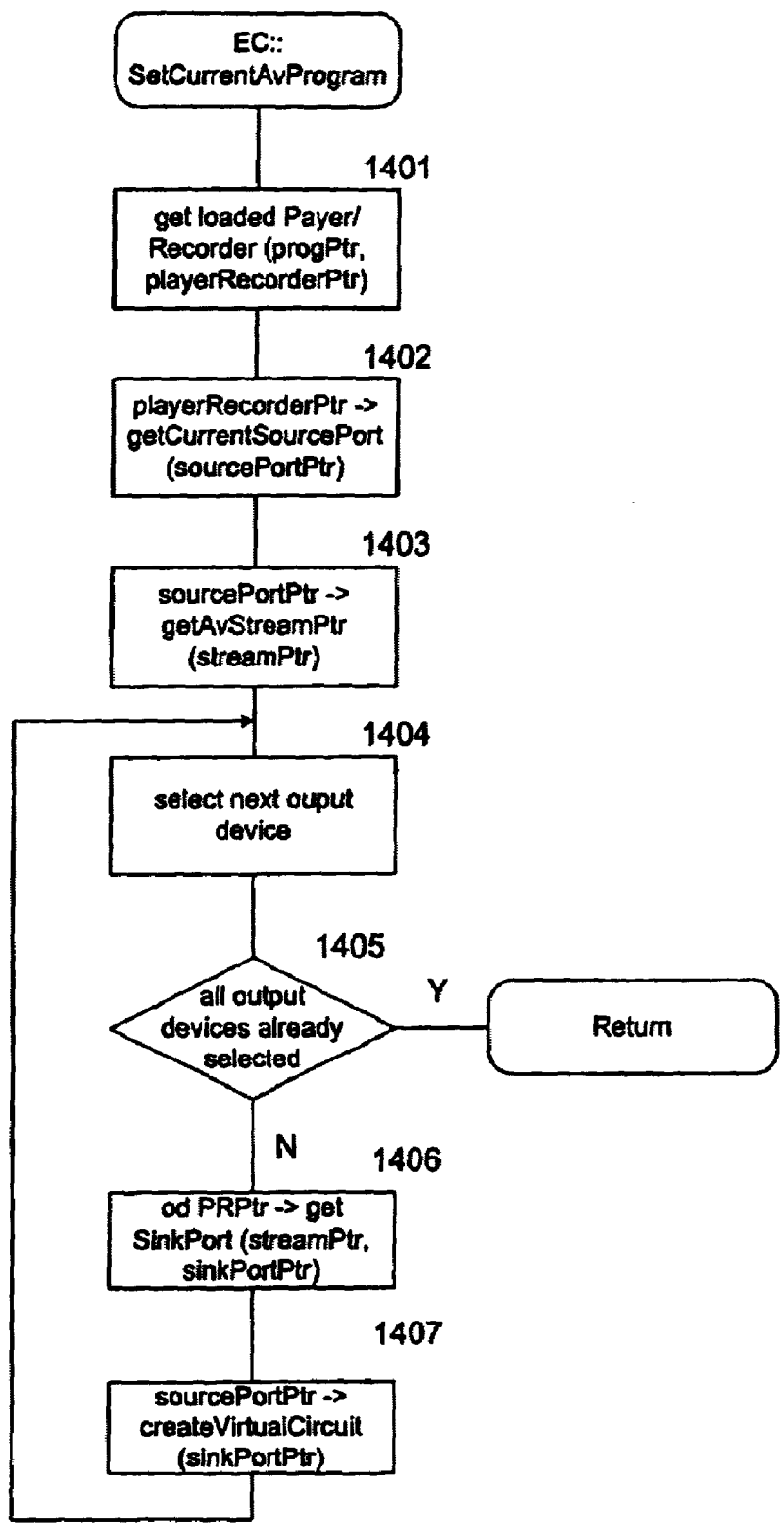
FIG. 14 is a flow diagram representing an example implementation of a set current program function of an entertainment center object.

FIG. 14 is a flow diagram representing an example implementation of a set of current program function of an entertainment center object. This function is passed a pointer to a program object and effects the loading of that program within the entertainment center. In step 1401, the function invokes a function to retrieve a loaded player/recorder object. The function passes a pointer to the program object and is returned a pointer to a player/recorder object that is loaded with the program. In step 1402, the function invokes the get current source function of the player/recorder object. That invoked function returns a pointer to the complete source port for the player/recorder object. In step 1403, the function invokes the get stream pointer function of the source port object to retrieve a pointer to the complete stream for that source port object. In steps 1404–1407, the function loops selecting the output components associated with the entertainment center and creating a virtual circuit from the player/recorder component to the output components. As described above, a entertainment center may have a default set of output components. In step 1404, the function selects the next output component. In step 1405, if all the output components have already been selected, then the function returns, else the function continues at step 1406. In step 1406, the function requests the selected output component to return a sink port object that is appropriate to the stream. The function invokes a get sink port function of the output object corresponding to the selected output component. In step 1407, the function invokes the create virtual circuit function of the source port object passing a pointer to the sink port object. That invoked function creates a virtual circuit from the source port to the sink port. The function then loops to step 1404 to select the next output component.

Figure 15:
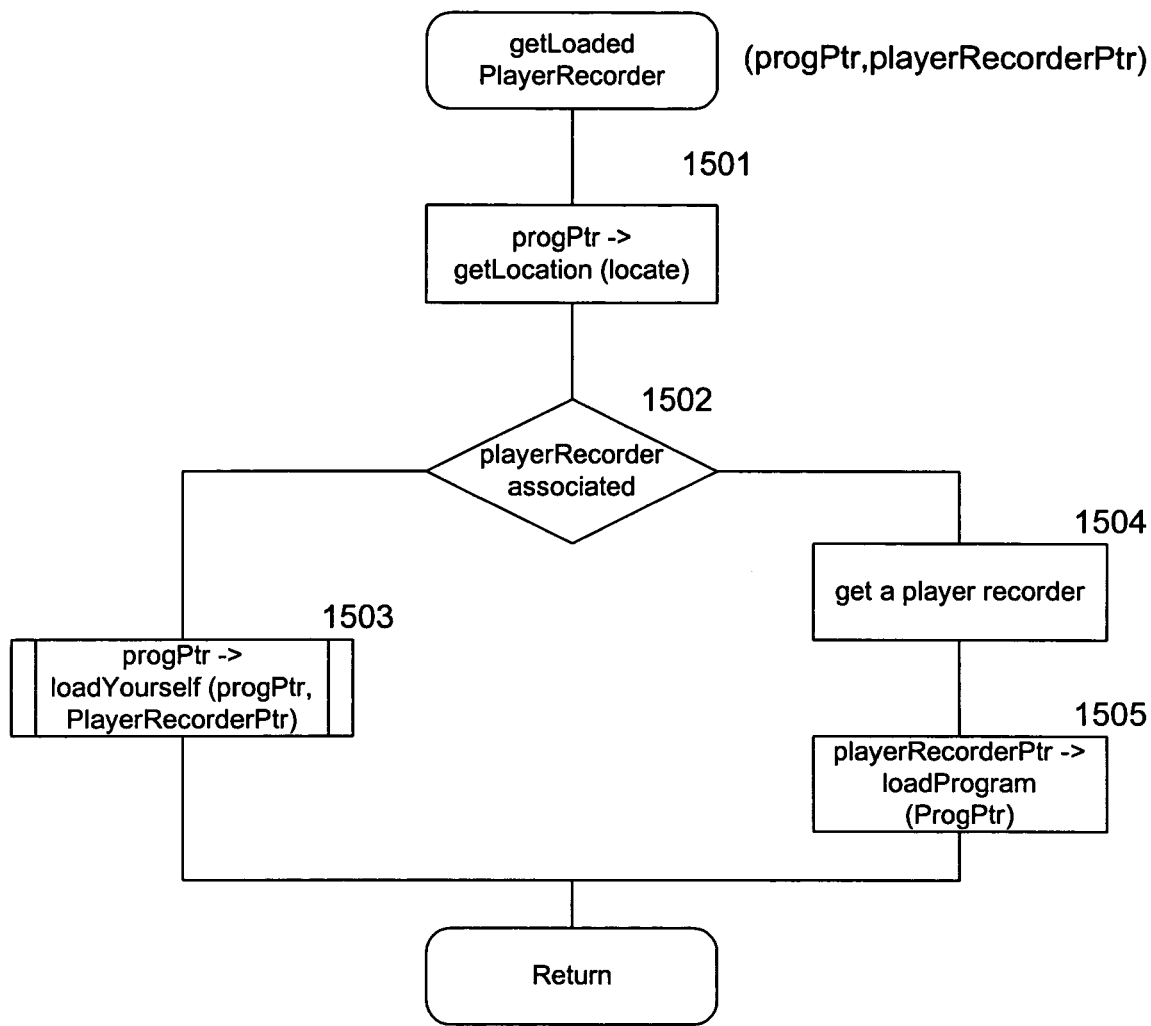
FIG. 15 is a flow diagram of an example implementation of a function to get a loaded player/recorder object.

FIG. 15 is a flow diagram of an example implementation of a function to get a loaded player/recorder object. This function is passed a pointer to a program object and returns a pointer to a player/recorder object. In step 1501, the function retrieves the location of the program object. In step 1502, if the location indicates that a player/recorder component is already associated with this program object, then the function continues at step 1503, else the function continues at step 1504. In step 1503, the function invokes the load yourself function of the program object and receives a pointer to a loaded player/recorder object in return. In step 1504, the function gets a player/recorder object that is appropriate to the entertainment center. In step 1505, the function invokes a load program function of the player/recorder object passing the pointer to the program object. The function then returns.

Figure 16:
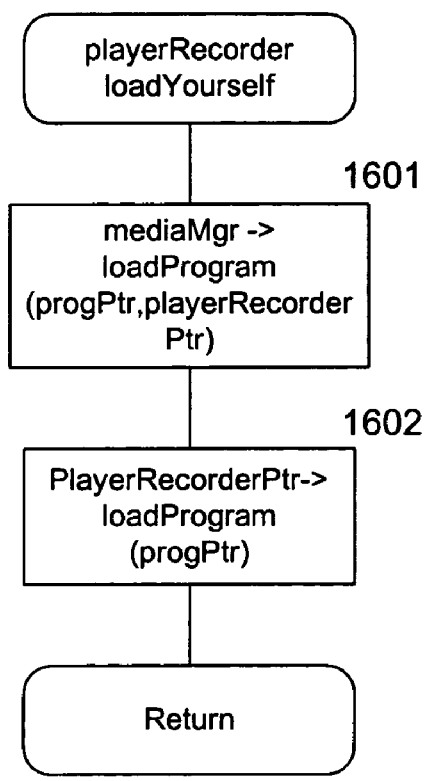
FIG. 16 is a flow diagram of example implementation of the load yourself function of the player/recorder object.

FIG. 16 is a flow diagram of example implementation of the load yourself function of the player/recorder object. This function is passed a pointer to a program object that is to be loaded into the player/recorder component. In step 1601, the function invokes a load program function of the media manager object passing a pointer to the program object and receiving a pointer to a player/recorder in return. In step 1602, the function invokes the load program function of the player/recorder object passing the program pointer and then returns.

Figure 17:
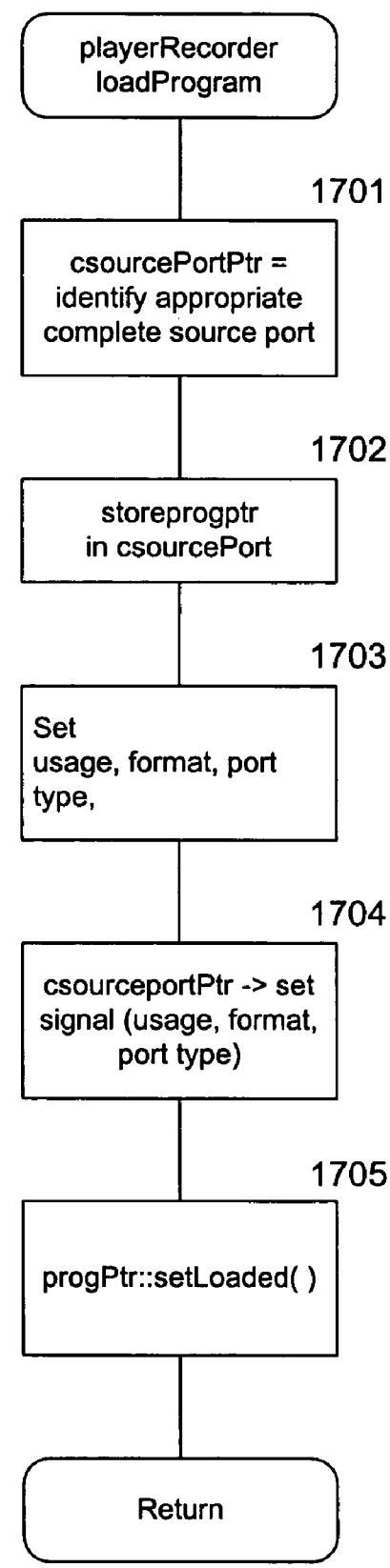
FIG. 17 is a flow diagram of an example implementation of the load program function of a player/recorder object.

FIG. 17 is a flow diagram of an example implementation of the load program function of a player/recorder object. This function is passed a pointer to a program object and effects the loading of the program into that player/recorder component. In step 1701, the function identifies a complete source port that is appropriate for the passed program. A player/recorder component may have more than one complete source port. For example, a player/recorder object may have a complete source for corresponding to an RGB signal and another complete source port corresponding to a digital video signal. In step 1702, the function assigns the program object to the player/recorder object. In step 1703, the function determines the usage, format, and port type for the primitive ports of the selected source port. In step 1704, the function invokes the set signal function of the complete source port passing the usage, format, and port type. The invoked function sets the usage, format, and port type for each primitive source port. In step 1705, the function notifies the program object that it has now been loaded. The function then returns.

Figures 18, 19:
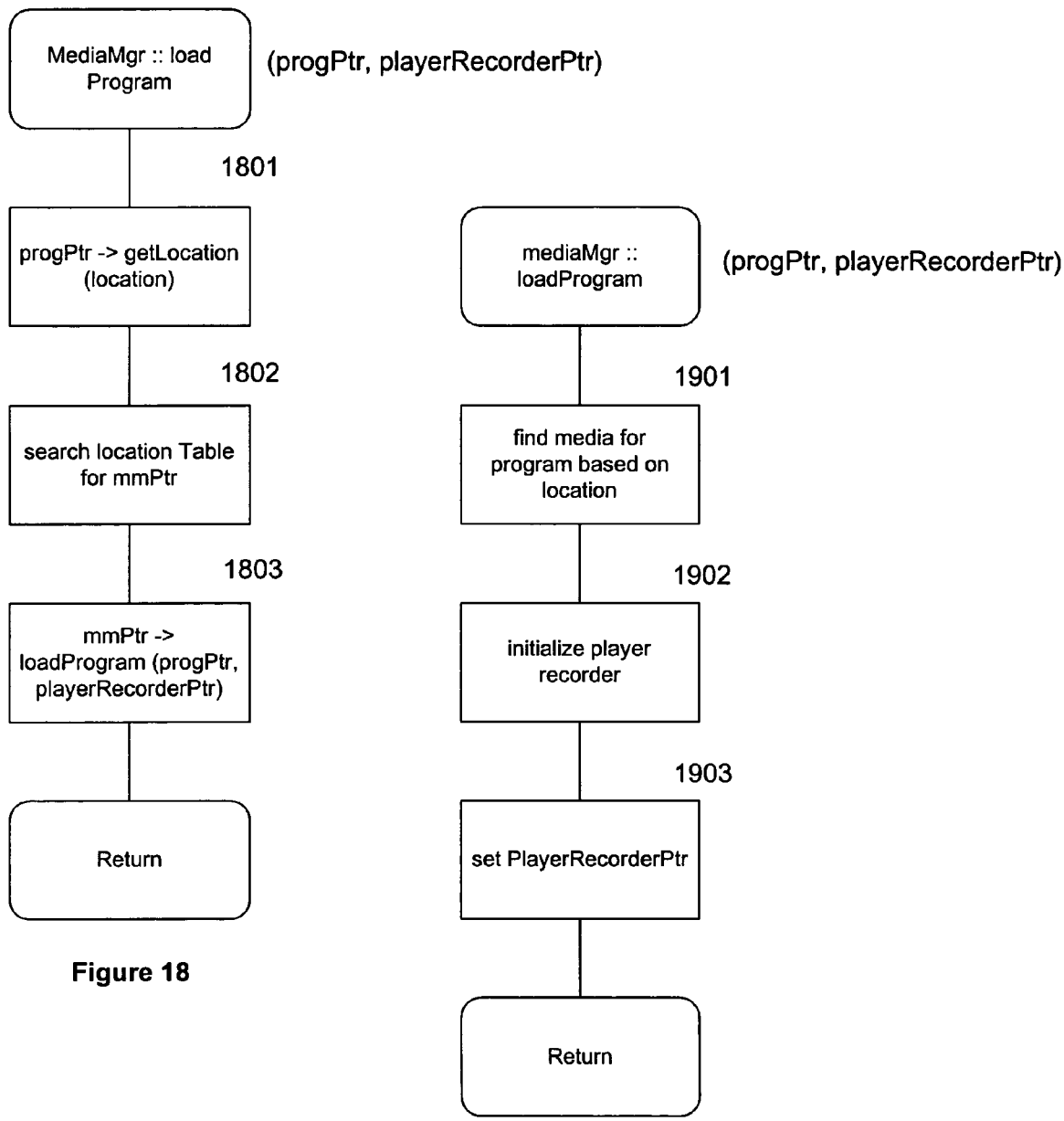
FIG. 18 is a flow diagram of an example load program function of a media manager object.
FIG. 19 is a flow diagram of another example load program function of the media manager object.

FIG. 18 is a flow diagram of an example load program function of a media manager object. This example function describes the processing that may be performed when the media manager has child media manager objects. This function is passed a pointer to a program object and returns a pointer to a player/recorder object. In step 1801, the function invokes the get location function of the program object to retrieve the location of the media as indicated by the program object. In step 1802, the function searches the location table for a media manager object that manages the media corresponding to program object. In step 1803, the function invokes the load program function of the located media manager object and then returns.

FIG. 19 is a flow diagram of an another example load program function of the media manager object. This example function describes the processing that may be performed when the media manager object has no child media manager object. In step 1901, the function retrieves the location from the program object and finds the media associated with that location. In step 1902, the function initializes a player/recorder object for that media. In step 1903, the function sets a return pointer to point to player/recorder object. The function then returns.

```
class Program
{
getProgramId(Id);
getProgramType(type);
getProgramLocation(location);
getDescProptertyValueByName(name, value);
getOwnerObjectPtr(ownerPtr);
getPlayerRecorderPtr(prPtr);
loadYourself( );
unloadYourself( );
getParent(parentPtr);
getChild(childPtr);
}
class ProgramPool
{
getPort(progPoolPortPtr);
}
class ProgPoolPort
{
getReference(id, progPtr);
getCursor(progPoolCursorPtr);
}
class ProgramPoolCursor
{
getMatchingSetOfReferences(set);
submitQuery(query);
advance( );
getReference(progPtr);
clone(ProgPoolPtr);
}
class PlayerRecorder
{
canLoadProgram(progPtr);
loadProgram(progPtr);
sendControlCommand(command);
}
class EntertainmentCenter
{
setCurrentActiveSourceProgram(progPtr);
}
```

One skilled in the art would appreciate that various modifications can be made to the present invention. Accordingly, the invention is not limited to the specific embodiments, but instead the scope of an invention is specified by the following claims.

The invention claimed is:

1. An audio/visual system, comprising:
   at least one output component having at least one source port for each type of output signal output from the at least one output component and at least one source port object for each of said at least one source port;
   at least one input component having at least one sink port for each type of input signal input to the at least one input component and at least one sink port object for each at least one sink port, wherein each at least one source port of said at least one output component is connectable to said at least one sink port of said at least one input component via at least one primitive circuit path;

at least one primitive circuit object for each at least one primitive circuit path with a signal at least one of (A) originating from a source port and (B) terminating at a sink port, wherein a virtual circuit object includes at least one reference to at least one primitive circuit object and each virtual circuit object contains primitive binding information corresponding to at least one virtual circuit path associated with the virtual circuit object; and wherein each output associated with a virtual circuit object outputs a stream of signals, the signals within the stream are hierarchically organized according to how source ports are organized within a complete source port, whereby the system represents the stream of an output component by a stream object.

2. An audio/visual system according to claim 1, wherein a stream object includes at least one of (A) at least one other stream object and (B) at least one child stream object, wherein a stream object that does not contain other stream objects is a primitive stream object and a stream object that is not contained in other stream objects is a complete stream object and whereby each primitive stream object includes a signal object that corresponds to the signal that is output by at least one of (A) the corresponding source port and (B) the corresponding output switching port.

3. An audio/visual system, comprising:

at least one output component having at least one source port for each type of output signal output from the at least one output component and at least one source port object for each of said at least one source port;

at least one input component having at least one sink port for each type of input signal input to the at least one input component and at least one sink port object for each at least one sink port, wherein each at least one source port of said at least one output component is connectable to said at least one sink port of said at least one input component via at least one primitive circuit path;

at least one primitive circuit object for each at least one primitive circuit path with a signal at least one of (A) originating from a source port and (B) terminating at a sink port; and wherein said at least one primitive circuit object is of a primitive circuit object class, and member functions of said primitive circuit object class include at least one of a function that returns a reference to the primitive source port of a primitive circuit and a function that returns a reference to the primitive sink port of a primitive circuit.

4. An audio/visual system, comprising:

at least one output component having at least one source port for each type of output signal output from the at least one output component and at least one source port object for each of said at least one source port;

at least one input component having at least one sink port for each type of input signal input to the at least one input component and at least one sink port object for each at least one sink port, wherein each at least one source port of said at least one output component is connectable to said at least one sink port of said at least one input component via at least one primitive circuit path;

at least one primitive circuit object for each at least one primitive circuit path with a signal at least one of (A) originating from a source port and (B) terminating at a sink port, wherein a virtual circuit object includes at least one reference to at least one primitive circuit object and each virtual circuit object contains primitive binding information corresponding to at least one virtual circuit path associated with the virtual circuit object; and wherein said virtual circuit object is of a virtual circuit object class, and member functions of said virtual circuit object class include at least one of a function that returns a reference to a complete source port that is producing the signals being routed by the subject virtual circuit, a function that returns a reference to a complete sink port that is receiving the signals being routed by the virtual circuit, a function that returns the number of bindings between primitive source ports and primitive sink ports for the designated virtual connection and a function that returns the designated numbered binding as a reference to the associated primitive source port and a reference to the associated primitive sink port.

5. An audio/visual system according to claim 1, wherein signals within a stream are of a signal class, wherein member functions of the signal class include at least one of (A) a function that returns the intended usage of the requesting signal, (B) a function that returns the format of the requesting signal, (C) a function that returns a reference to the stream which is the parent of the signal and (D) a function that returns a reference to the primitive source port that is outputting the signal.

6. An audio/visual system according to claim 5, wherein member functions include properties of the signal class.

7. An audio/visual system according to claim 1, wherein a stream is of a stream class, wherein member functions of the stream class includes at least one of a function that enables the enumeration of at least one child stream and a function that enables the retrieval of at least one child stream.

8. An audio/visual system according to claim 7, wherein a stream is of a stream class, wherein member functions of the stream class include at least one of (A) a function that returns an indication as to whether a stream is a complete stream, (B) a function that returns an indication as to whether a stream is a primitive stream, (C) a function that returns a reference to the stream that is the parent of a stream, (D) a function that returns the number of child streams of a stream, (E) a function that returns a reference to the designated numbered child stream of a stream, (F) a function that returns a reference to the source port that is producing a stream, (G) a function that returns a reference to the source program that is producing a stream and (H) a function that returns a reference to a signal in a stream.

9. An audio/visual system, comprising:

at least one output component having at least one source port for each type of output signal output from the at least one output component and at least one source port object for each of said at least one source port;

at least one input component having at least one sink port for each type of input signal input to the at least one input component and at least one sink port object for each at least one sink port, wherein each at least one source port of said at least one output component is connectable to said at least one sink port of said at least one one input component via at least one primitive circuit path;

at least one entertainment session;

at least one player/recorder component associated with each entertainment session including at least one output component, wherein a player/recorder component is a type of source object; and wherein an entertainment session of said at least one entertainment session provides a behavior that allows an audio/visual program to be assigned to a player/recorder component, and whereby when an audio/visual program is assigned to an entertainment session, the entertainment session loads the audio/visual program into a player/recorder, causes the program to be played by the player/recorder and routes at least one output signal of the player/recorder component to at least one associated output component.

10. An audio/visual system according to claim 9, wherein said loading of the audio/visual program into a player/recorder by said entertainment session includes at least one of (A) instantiating the audio/visual program on a player/recorder and (B) resolving the audio/visual program to a player/recorder appropriate for the audio/visual program.

11. An audio/visual system according to claim 9, wherein a space object is associated with each entertainment session designating its space, a player/recorder object is associated with each player/recorder component.

12. An audio/visual system according to claim 9, wherein an entertainment session includes at least one default output component, such that when an audio/visual program is assigned to the entertainment session, the at least one output signal for the player/recorder component is routed to at least one default output component.

13. An audio/visual system according to claim 9, wherein an entertainment session creates at least one virtual circuit to route said audio/visual program from said player/recorder component and to said at least one output component.

14. An audio/visual system according to claim 9, wherein an entertainment session at least one of dynamically creates at least one virtual circuit to route said audio/visual program to a plurality of output components and dynamically destroys at least one existing virtual circuit no longer needed to route said audio/visual program.

15. An audio/visual system according to claim 9, wherein said entertainment session provides said behavior in response to an external action in said system.

16. An audio/visual system according to claim 9, wherein, for each of its associated output components, an entertainment session at least one of (A) determines whether the routing of the audio/visual program is possible, (B) is notified of an action external to the entertainment session and (C) determines whether to provide a user interface for controlling the at least one output component to which the at least one signal is routed.

17. An audio/visual system according to claim 16, wherein when the entertainment session is notified that one of its output components has been activated due to an external action, the entertainment session becomes an additional controller of the player/recorder component outputting to the output component.

18. An audio/visual system according to claim 16, wherein said action external to the entertainment session includes a physical load of an audio/visual program into a physical device.

19. An audio/visual system according to claim 9, wherein an entertainment session provides a property notification when a property of one of an associated player/recorder component and associated output component changes.

20. An audio/visual system according to claim 19, wherein said providing of a property notification includes notifying a user interface component corresponding to the at least one player/recorder component and output component.

21. An audio/visual system according to claim 9, wherein an entertainment session provides a user interface component for controlling at least one user interface of at least one of (A) at least one input component and (B) at least one output component associated with the entertainment session.

22. An audio/visual system according to claim 9, wherein a player/recorder object has at least one associated complete source port object and has at least one associated complete sink port object and wherein each output component has at least one associated complete sink port and wherein the player/recorder object provides a behavior at least one of (A) to load an audio/visual program into a player/recorder component, (B) to allow at least one command to be sent to the player/recorder component, (C) to determine whether it is possible to load an audio/visual program into the player/recorder component and (D) to provide custom behavior customized to the corresponding player/recorder component.

23. An audio/visual system according to claim 9, wherein an output component has a type and an output component provides at least one of (A) a behavior that returns the identification of a sink port object that is appropriate for assigning the signals to the output component for a specified stream object, (B) a behavior that is specific to the type of output component, wherein the behavior is one of (a) part of the base object class and (b) provided through a derivation of that base object class.

24. An audio/visual system according to claim 9, further comprising:
 a program pool data structure hierarchically representing a set of audio/visual program entries, whereby each audio/visual program entry has a corresponding program pool data structure.

25. An audio/visual system according to claim 24, wherein an audio/visual program entry includes an audio/visual program object.

26. An audio/visual system according to claim 24, wherein an audio visual program entry includes a program type and program types include (A) broadcast program (B) single access physical media and (C) multiple access media.

27. An audio/visual system according to claim 26, wherein an audio/visual program entry includes a program type, and wherein possible program types include a tuner type, a tape machine type, a compact disk player type, a laser disk player type, a removable disk drive type, a hard drive type, a video cassette recorder type, a digital versatile disk player type, a video game system type, a JPEG image type, a streaming media type and a computing device type.

28. An audio/visual system according to claim 9, wherein an audio/visual program entry includes at least one child program object, and wherein said at least one child program object is hierarchically organized.

29. An audio/visual system according to claim 9, wherein a program pool data structure at least one of (A) provides a behavior to browse through the hierarchy of the audio/visual program entries represented by the program pool data structure, (B) allows a player/recorder component to be assigned to an audio/visual program entry of the program pool data structure, (C) provides a behavior corresponding to the loading of an audio/visual program entry into a player/recorder component and (D) allows an entertainment session to be created by a session manager.

30. An audio/visual system according to claim 29, wherein said providing of a behavior corresponding to the loading of an audio/visual program entry includes at least one of (A) instantiating the audio/visual program corresponding to the audio/visual program entry on a player/recorder and (B) resolving the audio/visual program corresponding to the audio/visual program entry to a player/recorder appropriate for the audio/visual program.

31. An audio/visual system according to claim 9, wherein an audio/visual program entry includes the identifier of an owner of the audio/visual program entry.

32. An audio/visual system according to claim 31, wherein the owner is one of (A) a second audio/visual program entry and (B) the program pool data structure that includes the audio/visual program entry.

33. An audio/visual system according to claim 32, wherein an audio/visual program entry at least one of (A) allows for the retrieving of its child program objects, (B) allows for the retrieving of its parent program object of which the audio/visual program entry is a child program object and (C) enables the establishment of at least one criterion so that only child program objects that match the at least one criterion are returned.

34. An audio/visual system according to claim 33, wherein a parent program object of an audio/visual program entry is retrieved via the associated program pool data structure by providing the location of the audio/visual program entry to the program pool data structure.

35. An audio/visual system according to claim 9, further comprising:
a program pool data structure hierarchically representing a set of audio/visual program entries, whereby each audio/visual program entry has a corresponding program pool data structure.

36. An audio/visual system according to claim 35, wherein an audio/visual program entry includes a program identification (ID), which provides descriptive information about the audio/visual program represented by the audio/visual program entry.

37. An audio/visual system according to claim 36, wherein said descriptive information includes at least one of a name associated with the audio/visual program, a time associated with the audio/visual program, a volume associated with the audio/visual program, a genre associated with the audio/visual program and a format associated with the audio/visual program.

38. An audio/visual system according to claim 37, wherein said descriptive information includes at least one location of at least one medium that corresponds to the audio/visual program.

39. An audio/visual system according to claim 38, wherein a location is represented as a path within a hierarchy of locations.

40. An audio/visual system according to claim 36, wherein an audio/visual program entry has an associated program type, which specifies a path through a hierarchy of program types.

41. An audio/visual system according to claim 36, wherein functions of components of the audio/visual system resolve a program ID into a plurality of different types of references including (A) a get program object function that resolves a program ID into a reference to a corresponding audio/visual program entry, (B) a get program genre function that resolves a program ID into a plurality of references to a set of audio/visual program entries in the same genre.

42. An audio/visual system according to claim 41, wherein the get program genre function causes the audio/visual program entry associated with the program ID to retrieve information relating its genre.

43. An audio/visual system according to claim 9, wherein an audio/visual program entry exposes an interface for maintenance of state of the audio/visual program entry including at least one of (A) an interface for one of adding and deleting a property of the audio/visual program entry, (B) an interface for setting a property of the audio/visual program entry, (C) an interface for one of adding and deleting a child program object of the audio/visual program entry and (D) an interface for deleting of the audio/visual program entry itself.

44. An audio/visual system according to claim 43, wherein an interface is specific to the type of audio/visual program represented by the audio/visual program entry.

45. An audio/visual system according to claim 9, wherein a program pool data structure provides an access port for each client that is accessing the program pool and wherein the program pool data structure exposes a function that receives a program ID and returns a reference to an audio/visual program entry corresponding to that program ID.

46. An audio/visual system according to claim 9, wherein a program pool data structure allows for database cursor-like access to the program objects, whereby when a query is submitted to the program pool data structure which specifies at least one criterion for audio/visual program entries, the program objects of the program pool data structure that match the at least one criterion are provided in a result set accessible to the client.

47. An audio/visual system according to claim 46, wherein a partial list of program objects that match the at least one criterion are provided in a result set while query continues to be processed.

48. An audio/visual system according to claim 46, wherein a client accesses the result set using at least one of (A) a function to advance to the next program object in the result set, (B) a get reference function for the current program object which returns a reference to the current program object of the result set and (C) a return a set of references function for the program objects in the result set that returns a set of references to the program objects.

49. An audio/visual system according to claim 46, wherein the result set of a query is cached at a client and wherein the program pool data structure automatically updates the client's cache as the set of programs that match the at least one criterion changes.

50. An audio/visual system according to claim 48, wherein the program pool data structure provides an access control mechanism to restrict access by an enumerated client.

51. An audio/visual system, comprising:
at least one output component having at least one source port for each type of output signal output from the at least one output component and at least one source port object for each of said at least one source port;
at least one input component having at least one sink port for each type of input signal input to the at least one input component and at least one sink port object for each at least one sink port, wherein each at least one source port of said at least one output component is connectable to said at least one sink port of said at least one input component via at least one primitive circuit path;
at least one entertainment session;
at least one player/recorder component associated with each entertainment session including at least one output component, wherein a player/recorder component is a type of source object;

wherein the process of assigning of a program to an entertainment session includes invoking a function to select an audio/visual program entry thereby returning a reference to the audio/visual program entry; and
invoking a set current program function of the entertainment session object passing the reference to the audio/visual program entry.

52. An audio/visual system, comprising:
at least one output component having at least one source port for each type of output signal output from the at least one output component and at least one source port object for each of said at least one source port;
at least one input component having at least one sink port for each type of input signal input to the at least one input component and at least one sink port object for each at least one sink port, wherein each at least one source port of said at least one output component is connectable to said at least one sink port of said at least one input component via at least one primitive circuit path;
at least one entertainment session;
at least one player/recorder component associated with each entertainment session including at least one output component, wherein a player/recorder component is a type of source object; and
wherein invoking the set current program function of an entertainment session object passes a reference to an audio/visual program entry thereby loading that audio/visual program entry within the entertainment session.

53. An audio/visual system according to claim 52, wherein said invoking includes:
invoking a function to retrieve a loaded player/recorder object;
passing a reference to the audio/visual program entry; and
returning a reference to a player/recorder object that is loaded with the program.

54. An audio/visual system according to claim 53, further including:
invoking a get current source function of the player/recorder object, thereby returning a reference to a complete source port for the player/recorder object; and
invoking a get stream reference function of the source port object to retrieve a reference to a complete stream for the source port object.

55. An audio/visual system according to claim 54, further including:
looping while selecting at least one output component associated with the entertainment session; and
creating a virtual circuit from the player/recorder component to each of the output components.

56. An audio/visual system according to claim 55, wherein said looping includes at least one of synchronous looping and asynchronous looping.

57. An audio/visual system according to claim 55, wherein said looping includes:
requesting a selected output component to return a sink port object that is appropriate to the type of stream;
invoking a get sink port function of the output object corresponding to the selected output component; and
invoking a create virtual circuit function of the source port object passing a reference to the sink port object, thereby creating a virtual circuit from the source port to the sink port.

58. An audio/visual system, comprising:
at least one output component having at least one source port for each type of output signal output from the at least one output component and at least one source port object for each of said at least one source port;
at least one input component having at least one sink port for each type of input signal input to the at least one input component and at least one sink port object for each at least one sink port, wherein each at least one source port of said at least one output component is connectable to said at least one sink port of said at least one input component via at least one primitive circuit path;
at least one entertainment session;
at least one player/recorder component associated with each entertainment session including at least one output component, wherein a player/recorder component is a type of source object;
wherein the entertainment session includes a load program function to retrieve a loaded player/recorder object, which passes a reference to an audio/visual program entry and returns a reference that has been allocated to a player/recorder object, said load program includes retrieving the location information from the audio/visual program entry;
if the location information indicates that a player/recorder component is associated with the audio/visual program entry, invoking a load function of the audio/visual program entry and receiving a reference to a loaded player/recorder object in return; and
if the location information indicates that a player/recorder component is not already associated with the audio/visual program entry, receiving a reference to the loaded player/recorder object.

59. An audio/visual system according to claim 58, further including:
retrieving a player/recorder object that is appropriate to an associated entertainment session; and
invoking a load program function of the player/recorder object passing the reference to the audio/visual program entry.

60. An audio/visual system according to claim 59, wherein the load function of the player/recorder object includes:
invoking a load program function of the media manager object passing a reference to the audio/visual program entry, receiving a reference to a player/recorder object in return; and
invoking the load program function of the player/recorder object passing the program reference.

61. An audio/visual system according to claim 58, wherein the load program function of a player/recorder object, which is passed a reference to an audio/visual program entry and effects the loading of the program into that player/recorder component includes:
identifying a complete source port of the player/recorder component that is appropriate for the passed program;
assigning the audio/visual program entry to the player/recorder object;
determining at least one of the usage, format and port type for the primitive ports of the selected source port;
invoking a set signal function of the complete source port passing said at least one of the usage, format and port type, thereby setting the usage, format and port type for each primitive source port; and
notifying the audio/visual program entry that it has been loaded.

62. An audio/visual system according to claim 60, wherein the load program function of a media manager object, which is performed when the media manager object has at least one child media manager object, includes:
    passing a reference to an audio/visual program entry and returning a reference to a player/recorder object;
    invoking a get location function of the audio/visual program entry to retrieve location information from the audio/visual program entry;
    searching a location table for a media manager object that manages the media corresponding to the audio/visual program entry; and
    invoking the load program function of the located media manager object.

63. An audio/visual system according to claim 60, wherein the load program function of a media manager object, which is performed when the media manager object has zero child media manager objects, includes:
    retrieving location information from the audio/visual program entry and automatically finding the media associated with the location information;
    initializing an appropriate object for the media; and
    setting a return reference to the appropriate object.

64. A method for establishing a path between a source component and an input component in an audio/visual system comprising at least one source component having at least one source port capable of supporting each type of output signal output from the at least one source component and at least one primitive source port object for each of said at least one source port; and at least one input component having at least one sink port capable of supporting each type of input signal input to the at least one input component and a primitive sink port object for each sink port, wherein each at least one source port of said at least one source component is connectable to said at least one sink port of said at least one input component via at least one primitive circuit path, including:
    instantiating a virtual circuit object that establishes a path between the source port corresponding to the complete source port object and the sink port corresponding to the complete sink port object;
    requesting the output object to provide a reference to a complete source port object;
    requesting the complete source port object to provide a reference to its corresponding complete stream object; and
    requesting the input object to provide a reference to its corresponding complete sink port object.

65. A method for establishing a path between a source component and an input component in an audio/visual system comprising at least one source component having at least one source port capable of supporting each type of output signal output from the at least one source component and at least one primitive source port object for each of said at least one source port; and at least one input component having at least one sink port capable of supporting each type of input signal input to the at least one input component and a primitive sink port object for each sink port, wherein each at least one source port of said at least one source component is connectable to said at least one sink port of said at least one input component via at least one primitive circuit path, including:
    instantiating a virtual circuit object that establishes a path between the source port corresponding to the complete source port object and the sink port corresponding to the complete sink port object;
    invoking a create virtual circuit function wherein said invoking includes passing a reference to the sink port object;
    in response to said invoking, constructing a new virtual circuit object wherein said constructing includes passing to a constructor a reference to the source port object and a reference to the sink port object; and
    adding the new virtual circuit object to a list of virtual circuits associated with the source port object.

66. A method according to claim 65, wherein said constructing of the new virtual circuit object includes:
    retrieving by the constructor a reference to the stream associated with the source port object;
    assigning the stream by the constructor to the sink port object by invoking an assign stream function of the sink port object passing a reference to the stream object, thereby returning the number of signal objects within the stream object that are assigned to the complete sink port object; and
    creating a primitive binding object for each signal object that is assigned to the sink port object.

67. A method according to claim 66, wherein said creating of a primitive binding object for each signal object includes:
    selecting by the constructor the first signal number, and if the first signal number has been selected, selecting by the constructor the next signal number;
    if the selected number is less than or equal to the number of assigned signals, retrieving by the constructor (A) a reference to the primitive sink port object corresponding to the numbered signal object and (B) a reference to the signal object, wherein said retrieving includes invoking a get assignment reference function of the sink port object;
    retrieving by the constructor a reference to the primitive source port object for the corresponding signal port object;
    retrieving by the constructor a reference to the sink port object of the primitive source port object;
    if the primitive sink port object of the primitive circuit of the primitive sink port object is the same as the primitive sink port object of the primitive circuit of the primitive source port object, directly connecting the source port and the sink port, otherwise, connecting the source port and the sink port through a switching mechanism.

68. A method according to claim 67, wherein if the connection is through a switching mechanism, invoking by the constructor a process-not-direct-connection function; and
    adding by the constructor an identification of a binding from the primitive source port to the primitive sink port to a binding table of the virtual circuit object, wherein the binding represents the identity of the primitive source port object, the identity of the input switch port object of the switching mechanism, the identity of the output switch port object of the switching mechanism and the identity of the primitive sink port object.

69. A method according to claim 68, wherein said invoking of the process-not-direct-connection function includes:
    retrieving a reference to the switch input port object for the primitive circuit of the primitive source port object;
    retrieving a reference to the primitive source port object;
    retrieving a reference to the output switch port object of the retrieved primitive circuit; and
    creating a connection between the input switch port object and the output switch port object.

70. A method according to claim 67, wherein if the connection is direct,
    adding by the constructor an identification of a binding from the primitive source port to the primitive sink port to a binding table of the virtual circuit object, wherein the binding represents the identity of the primitive source port object and the identity of the primitive sink port object.

71. A method, for use in connection with an audio/visual system, comprising:
   connecting at least one source port of at least one output component to at least one sink port of at least one input component via at least one primitive circuit path;
   wherein each of said at least one output component includes at least one source port for each type of output signal output from the at least one output component and at least one source port object for each of said at least one source port;
   wherein each of said at least one input component includes at least one sink port for each type of input signal input to the at least one input component and at least one sink port object for each at least one sink port;
   wherein at least one primitive circuit object is generated for each at least one primitive circuit path with a signal at least one of (A) originating from a source port and (B) terminating at a sink port;
   wherein a virtual circuit object includes at least one reference to at least one primitive circuit object and each virtual circuit object contains primitive binding information corresponding to at least one virtual circuit path associated with the virtual circuit object; and
   further including outputting a stream of signals by each output associated with a virtual circuit object, wherein the signals within the stream are hierarchically organized according to how source ports are organized within a complete source port, whereby the system represents the stream of an output component by a stream object.

72. A method according to claim 71, wherein a stream object includes at least one of (A) at least one other stream object and (B) at least one child stream object, wherein a stream object that does not contain other stream objects is a primitive stream object and a stream object that is not contained in other stream objects is a complete stream object and whereby each primitive stream object includes a signal object that corresponds to the signal that is output by at least one of (A) the corresponding source port and (B) the corresponding output switching port.

73. A method, for use in connection with an audio/visual system, comprising:
   connecting at least one source port of at least one output component to at least one sink port of at least one input component via at least one primitive circuit path;
   wherein each of said at least one output component includes at least one source port for each type of output signal output from the at least one output component and at least one source port object for each of said at least one source port;
   wherein each of said at least one input component includes at least one sink port for each type of input signal input to the at least one input component and at least one sink port object for each at least one sink port;
   wherein at least one primitive circuit object is generated for each at least one primitive circuit path with a signal at least one of (A) originating from a source port and (B) terminating at a sink port; and
   wherein said at least one primitive circuit object is of a primitive circuit object class, and member functions of said primitive circuit object class include at least one of a function that returns a reference to the primitive source port of a primitive circuit and a function that returns a reference to the primitive sink port of a primitive circuit.

74. A method for use in connection with an audio/visual system, comprising:
   connecting at least one source port of at least one output component to at least one sink port of at least one input component via at least one primitive circuit path;
   wherein each of said at least one output component includes at least one source port for each type of output signal output from the at least one output component and at least one source port object for each of said at least one source port;
   wherein each of said at least one input component includes at least one sink port for each type of input signal input to the at least one input component and at least one sink port object for each at least one sink port;
   wherein at least one primitive circuit object is generated for each at least one primitive circuit path with a signal at least one of (A) originating from a source port and (B) terminating at a sink port;
   wherein a virtual circuit object includes at least one reference to at least one primitive circuit object and each virtual circuit object contains primitive binding information corresponding to at least one virtual circuit path associated with the virtual circuit object; and
   wherein said virtual circuit object is of a virtual circuit object class, and member functions of said virtual circuit object class include at least one of a function that returns a reference to a complete source port that is producing the signals being routed by the subject virtual circuit, a function that returns a reference to a complete sink port that is receiving the signals being routed by the virtual circuit, a function that returns the number of bindings between primitive source ports and primitive sink ports for the designated virtual connection and a function that returns the designated numbered binding as a reference to the associated primitive source port and a reference to the associated primitive sink port.

75. A method according to claim 71, wherein signals within a stream are of a signal class, wherein member functions of the signal class include at least one of (A) a function that returns the intended usage of the requesting signal, (B) a function that returns the format of the requesting signal, (C) a function that returns a reference to the stream which is the parent of the signal and (D) a function that returns a reference to the primitive source port that is outputting the signal.

76. A method according to claim 75, wherein member functions include properties of the signal class.

77. A method according to claim 71, wherein a stream is of a stream class, wherein member functions of the stream class includes at least one of a function that enables the enumeration of at least one child stream and a function that enables the retrieval of at least one child stream.

78. A method according to claim 77, wherein a stream is of a stream class, wherein member functions of the stream class include at least one of (A) a function that returns an indication as to whether a stream is a complete stream, (B) a function that returns an indication as to whether a stream is a primitive stream, (C) a function that returns a reference to the stream that is the parent of a stream, (D) a function that returns the number of child streams of a stream, (E) a function that returns a reference to the designated numbered child stream of a stream, (F) a function that returns a reference to the source port that is producing a stream, (G)

a function that returns a reference to the source program that is producing a stream and (H) a function that returns a reference to a signal in a stream.

79. A method, for use in connection with an audio/visual system, comprising:
   connecting at least one source port of at least one output component to at least one sink port of at least one input component via at least one primitive circuit path;
   wherein each of said at least one output component includes at least one source port for each type of output signal output from the at least one output component and at least one source port object for each of said at least one source port;
   wherein each of said at least one input component includes at least one sink port for each type of input signal input to the at least one input component and at least one sink port object for each at least one sink port;
   generating at least one entertainment session;
   associating at least one player/recorder component with each entertainment session including at least one output component, wherein a player/recorder component is a type of source object; and
   further including providing a behavior by an entertainment session of said at least one entertainment session, wherein the behavior allows an audio/visual program to be assigned to a player/recorder component, and whereby when an audio/visual program is assigned to an entertainment session, further comprising loading the audio/visual program into a player/recorder by the entertainment session, causing the program to be played by the player/recorder and routing at least one output signal of the player/recorder component to at least one associated output component.

80. A method according to claim 79, wherein said loading of the audio/visual program into a player/recorder by said entertainment session includes at least one of (A) instantiating the audio/visual program on a player/recorder and (B) resolving the audio/visual program to a player/recorder appropriate for the audio/visual program.

81. A method according to claim 79, wherein a space object is associated with each entertainment session designating its space, a player/recorder object is associated with each player/recorder component.

82. A method according to claim 79, wherein an entertainment session includes at least one default output component, such that when an audio/visual program is assigned to the entertainment session, the at least one output signal for the player/recorder component is routed to at least one default output component.

83. A method according to claim 79, further comprising creating by an entertainment session at least one virtual circuit to route said audio/visual program from said player/recorder component and to said at least one output component.

84. A method according to claim 79, further comprising at least one of dynamically creating by an entertainment session at least one virtual circuit to route said audio/visual program to a plurality of output components and dynamically destroying at least one existing virtual circuit no longer needed to route said audio/visual program.

85. A method according to claim 79, wherein said entertainment session provides said behavior in response to an external action in said system.

86. A method according to claim 79, further comprising, for each of its associated output components, at least one of (A) determining by an entertainment session whether the routing of the audio/visual program is possible, (B) notifying an entertainment session of an action external to the entertainment session and (C) determining by an entertainment session whether to provide a user interface for controlling the at least one output component to which the at least one signal is routed.

87. A method according to claim 86, further including the entertainment session becoming an additional controller of a player/recorder component outputting to the output component when the entertainment session is notified that one of its output components has been activated due to an external action.

88. A method according to claim 86, wherein said action external to the entertainment session includes a physical load of an audio/visual program into a physical device.

89. A method according to claim 79, further including providing by an entertainment session a property notification when a property of one of an associated player/recorder component and associated output component changes.

90. A method according to claim 89, wherein said providing of a property notification includes notifying a user interface component corresponding to the at least one player/recorder component and output component.

91. A method according to claim 79, further including providing by an entertainment session a user interface component for controlling at least one user interface of at least one of (A) at least one input component and (B) at least one output component associated with the entertainment session.

92. A method according to claim 79, wherein a player/recorder object has at least one associated complete source port object and has at least one associated complete sink port object and wherein each output component has at least one associated complete sink port and further comprising providing a behavior by the player/recorder object at least one of (A) to load an audio/visual program into a player/recorder component, (B) to allow at least one command to be sent to the player/recorder component, (C) to determine whether it is possible to load an audio/visual program into the player/recorder component and (D) to provide custom behavior customized to the corresponding player/recorder component.

93. A method according to claim 79, wherein an output component has a type and an output component provides at least one of (A) a behavior that returns the identification of a sink port object that is appropriate for assigning the signals to the output component for a specified stream object, (B) a behavior that is specific to the type of output component, wherein the behavior is one of (a) part of the base object class and (b) provided through a derivation of that base object class.

94. A method according to claim 79, further comprising:
   generating a program pool data structure hierarchically representing a set of audio/visual program entries, whereby each audio/visual program entry has a corresponding program pool data structure.

95. A method according to claim 94, wherein an audio/visual program entry includes an audio/visual program object.

96. A method according to claim 94, wherein an audio/visual program entry includes a program type and program types include (A) broadcast program (B) single access physical media and (C) multiple access media.

97. A method according to claim 96, wherein an audio/visual program entry includes a program type, and wherein possible program types include a tuner type, a tape machine type, a compact disk player type, a laser disk player type, a removable disk drive type, a hard drive type, a video cassette recorder type, a digital versatile disk player type, a video game system type, a JPEG image type, a streaming media type and a computing device type.

98. A method according to claim 79, wherein an audio/visual program entry includes at least one child program object, and wherein said at least one child program object is hierarchically organized.

99. A method according to claim 79, further comprising at least one of (A) providing by a program pool data structure a behavior to browse through the hierarchy of the audio/visual program entries represented by the program pool data structure, (B) allowing by a program pool data structure a player/recorder component to be assigned to an audio/visual program entry of the program pool data structure, (C) providing by a program pool data structure a behavior corresponding to the loading of an audio/visual program entry into a player/recorder component and (D) allowing by a program pool data structure an entertainment session to be created by a session manager.

100. A method according to claim 99, wherein said providing of a behavior corresponding to the loading of an audio/visual program entry includes at least one of (A) instantiating the audio/visual program corresponding to the audio/visual program entry on a player/recorder and (B) resolving the audio/visual program corresponding to the audio/visual program entry to a player/recorder appropriate for the audio/visual program.

101. A method according to claim 79, wherein an audio/visual program entry includes the identifier of an owner of the audio/visual program entry.

102. A method according to claim 101, wherein the owner is one of (A) a second audio/visual program entry and (B) the program pool data structure that includes the audio/visual program entry.

103. A method according to claim 79, further comprising at least one of (A) allowing by an audio/visual program entry for the retrieving of its child program objects, (B) allowing by an audio/visual program entry for the retrieving of its parent program object of which the audio/visual program entry is a child program object and (C) enabling by an audio/visual program entry the establishment of at least one criterion so that only child program objects that match the at least one criterion are returned.

104. A method according to claim 103, further including retrieving by a parent program object an audio/visual program entry, via the associated program pool data structure by providing the location of the audio/visual program entry to the program pool data structure.

105. A method according to claim 79, further comprising:
generating a program pool data structure hierarchically representing a set of audio/visual program entries, whereby each audio/visual program entry has a corresponding program pool data structure.

106. A method according to claim 105, wherein an audio/visual program entry includes a program identification (ID), which provides descriptive information about the audio/visual program represented by the audio/visual program entry.

107. A method according to claim 106, wherein said descriptive information includes at least one of a name associated with the audio/visual program, a time associated with the audio/visual program, a volume associated with the audio/visual program, a genre associated with the audio/visual program and a format associated with the audio/visual program.

108. A method according to claim 107, wherein said descriptive information includes at least one location of at least one medium that corresponds to the audio/visual program.

109. A method according to claim 108, wherein a location is represented as a path within a hierarchy of locations.

110. A method according to claim 106, wherein an audio/visual program entry has an associated program type, which specifies a path through a hierarchy of program types.

111. A method according to claim 106, wherein functions of components of the audio/visual system resolve a program ID into a plurality of different types of references including (A) a get program object function that resolves a program ID into a reference to a corresponding audio/visual program entry, (B) a get program genre function that resolves a program ID into a plurality of references to a set of audio/visual program entries in the same genre.

112. A method according to claim 111, further including causing via the get program genre function the audio/visual program entry associated with the program ID to retrieve information relating its genre.

113. A method according to claim 79, further including exposing by an audio/visual program entry an interface for maintenance of state of the audio/visual program entry including at least one of (A) an interface for one of adding and deleting a property of the audio/visual program entry, (B) an interface for setting a property of the audio/visual program entry, (C) an interface for one of adding and deleting a child program object of the audio/visual program entry and (D) an interface for deleting of the audio/visual program entry itself.

114. A method according to claim 113, wherein an interface is specific to the type of audio/visual program represented by the audio/visual program entry.

115. A method according to claim 79, further including providing by a program pool data structure an access port for each client that is accessing the program pool and wherein the program pool data structure exposes a function that receives a program ID and returns a reference to an audio/visual program entry corresponding to that program ID.

116. A method according to claim 79, further comprising providing by a program pool data structure for database cursor-like access to the program objects, and providing the program objects of the program pool data structure that match the at least one criterion in a result set accessible to the client when a query is submitted to the program pool data structure which specifies at least one criterion for audio/visual program entries.

117. A method according to claim 116, wherein said providing includes providing a partial list of program objects that match the at least one criterion in a result set while query continues to be processed.

118. A method according to claim 116, further comprising accessing by a client the result set using at least one of (A) a function to advance to the next program object in the result set, (B) a get reference function for the current program object which returns a reference to the current program object of the result set and (C) a return a set of references function for the program objects in the result set that returns a set of references to the program objects.

119. A method according to claim 116, further comprising caching the result set of a query at a client and automatically updating by the program pool data structure the client's cache as the set of programs that match the at least one criterion changes.

120. A method according to claim 119, wherein said accessing includes providing by the program pool data structure an access control mechanism to restrict access by an enumerated client.

121. A method for use in connection with an audio/visual system, comprising:
connecting at least one source port of at least one output component to at least one sink port of at least one input component via at least one primitive circuit path;
wherein each of said at least one output component includes at least one source port for each type of output signal output from the at least one output component and at least one source port object for each of said at least one source port;
wherein each of said at least one input component includes at least one sink port for each type of input signal input to the at least one input component and at least one sink port object for each at least one sink port;
generating at least one entertainment session;
associating at least one player/recorder component with each entertainment session including at least one output component, wherein a player/recorder component is a type of source object;
wherein the process of assigning of a program to an entertainment session includes invoking a function to select an audio/visual program entry thereby returning a reference to the audio/visual program entry; and
invoking a set current program function of the entertainment session object passing the reference to the audio/visual program entry.

122. A method, for use in connection with an audio/visual system, comprising:
connecting at least one source port of at least one output component to at least one sink port of at least one input component via at least one primitive circuit path;
wherein each of said at least one output component includes at least one source port for each type of output signal output from the at least one output component and at least one source port object for each of said at least one source port;
wherein each of said at least one input component includes at least one sink port for each type of input signal input to the at least one input component and at least one sink port object for each at least one sink port;
generating at least one entertainment session;
associating at least one player/recorder component with each entertainment session including at least one output component, wherein a player/recorder component is a type of source object; and
wherein invoking the set current program function of an entertainment session object passes a reference to an audio/visual program entry thereby loading that audio/visual program entry within the entertainment session.

123. A method according to claim 122, wherein said invoking includes:
invoking a function to retrieve a loaded player/recorder object;
passing a reference to the audio/visual program entry; and
returning a reference to a player/recorder object that is loaded with the program.

124. A method according to claim 123, further including:
invoking a get current source function of the player/recorder object, thereby returning a reference to a complete source port for the player/recorder object; and
invoking a get stream reference function of the source port object to retrieve a reference to a complete stream for the source port object.

125. A method according to claim 124, further including:
looping while selecting at least one output component associated with the entertainment session; and
creating a virtual circuit from the player/recorder component to each of the output components.

126. A method according to claim 125, wherein said looping includes at least one of synchronous looping and asynchronous looping.

127. A method according to claim 125, wherein said looping includes:
requesting a selected output component to return a sink port object that is appropriate to the type of stream;
invoking a get sink port function of the output object corresponding to the selected output component; and
invoking a create virtual circuit function of the source port object passing a reference to the sink port object, thereby creating a virtual circuit from the source port to the sink port.

128. A method for use in connection with an audio/visual system, comprising:
connecting at least one source port of at least one output component to at least one sink port of at least one input component via at least one primitive circuit path;
wherein each of said at least one output component includes at least one source port for each type of output signal output from the at least one output component and at least one source port object for each of said at least one source port;
wherein each of said at least one input component includes at least one sink port for each type of input signal input to the at least one input component and at least one sink port object for each at least one sink port;
generating at least one entertainment session;
associating at least one player/recorder component with each entertainment session including at least one output component, wherein a player/recorder component is a type of source object;
wherein the entertainment session includes a load program function to retrieve a loaded player/recorder object, which passes a reference to an audio/visual program entry and returns a reference that has been allocated to a player/recorder object, said load program includes retrieving the location information from the audio/visual program entry;
if the location information indicates that a player/recorder component is associated with the audio/visual program entry, invoking a load function of the audio/visual program entry and receiving a reference to a loaded player/recorder object in return; and
if the location information indicates that a player/recorder component is not already associated with the audio/visual program entry, receiving a reference to the loaded player/recorder object.

129. A method according to claim 128, further including:
retrieving a player/recorder object that is appropriate to an associated entertainment session; and
invoking a load program function of the player/recorder object passing the reference to the audio/visual program entry.

130. A method according to claim 129, wherein the load function of the player/recorder object includes:
invoking a load program function of the media manager object passing a reference to the audio/visual program entry, receiving a reference to a player/recorder object in return; and
invoking the load program function of the player/recorder object passing the program reference.

131. A method according to claim 128, wherein the load program function of a player/recorder object, which is passed a reference to an audio/visual program entry and effects the loading of the program into that player/recorder component, includes:
  identifying a complete source port of the player/recorder component that is appropriate for the passed program;
  assigning the audio/visual program entry to the player/recorder object;
  determining at least one of the usage, format and port type for the primitive ports of the selected source port;
  invoking a set signal function of the complete source port passing said at least one of the usage, format and port type, thereby setting the usage, format and port type for each primitive source port; and
  notifying the audio/visual program entry that it has been loaded.

132. A method according to claim 130, wherein the load program function of a media manager object, which is performed when the media manager object has at least one child media manager object, includes:
  passing a reference to an audio/visual program entry and returning a reference to a player/recorder object;
  invoking a get location function of the audio/visual program entry to retrieve location information from the audio/visual program entry;
  searching a location table for a media manager object that manages the media corresponding to the audio/visual program entry; and
  invoking the load program function of the located media manager object.

133. A method according to claim 130, wherein the load program function of a media manager object, which is performed when the media manager object has zero child media manager objects, includes:
  retrieving location information from the audio/visual program entry and automatically finding the media associated with the location information;
  initializing an appropriate object for the media; and
  setting a return reference to the appropriate object.

* * * * *